(12) United States Patent
Gomaa et al.

(10) Patent No.: US 10,709,007 B2
(45) Date of Patent: Jul. 7, 2020

(54) NON-EQUILIBRIUM PLASMA SYSTEM AND METHOD OF REFINING SYNGAS

(71) Applicant: Plasco Conversion Technologies Inc., Kanata, Ontario (CA)

(72) Inventors: Islam Gomaa, Nepean (CA); Andreas Tsangaris, Ottawa (CA); Graeme Hay, Kanata (CA)

(73) Assignee: PLASCO CONVERSION TECHNOLOGIES INC., Kanata, Ontario (CA)

(*) Notice: Subject to any disclaimer, the term of this patent is extended or adjusted under 35 U.S.C. 154(b) by 167 days.

(21) Appl. No.: 15/515,222

(22) PCT Filed: Sep. 30, 2015

(86) PCT No.: PCT/CA2015/050980
§ 371 (c)(1),
(2) Date: Mar. 29, 2017

(87) PCT Pub. No.: WO2016/049762
PCT Pub. Date: Apr. 7, 2016

(65) Prior Publication Data
US 2017/0231078 A1 Aug. 10, 2017

Related U.S. Application Data

(60) Provisional application No. 62/057,383, filed on Sep. 30, 2014.

(51) Int. Cl.
*H05H 1/48* (2006.01)
*C01B 3/50* (2006.01)
*H05H 1/34* (2006.01)

(52) U.S. Cl.
CPC .......... *H05H 1/48* (2013.01); *C01B 3/50* (2013.01); *C01B 2203/048* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 3,324,027 A | * | 6/1967 | Berghaus | B01J 19/088 |
| | | | | 422/186.06 |
| 3,328,276 A | * | 6/1967 | Schmidt | H05H 1/40 |
| | | | | 204/170 |

(Continued)

FOREIGN PATENT DOCUMENTS

| | | |
|---|---|---|
| CN | 201722188 U | 1/2011 |
| FR | 2775864 A1 | 9/1999 |

(Continued)

OTHER PUBLICATIONS

Nunnally et al., "Gliding arc plasma oxidative steam reforming of a simulated syngas containing naphthalene and toluene", International Journal of Hydrogen Energy, vol. 39, Issue 23, Aug. 4, 2014, pp. 11976-11989.

(Continued)

*Primary Examiner* — Kaity V Chandler
(74) *Attorney, Agent, or Firm* — Rothwell, Figg, Ernst & Manbeck, P.C.

(57) ABSTRACT

An object of the present invention is to provide a non-equilibrium plasma (NEP) system and method of refining syngas. In accordance with an aspect of the present invention, there is provided a non-equilibrium plasma system for refining syngas, the system comprising a reactor with a hollow chamber, having one or more inlet manifolds configured to promote an axially symmetric and swirling flow pattern, into which syngas and one or more gasifying agents are introduced for processing within the reactor, a high voltage electrode; and a ground electrode, wherein the system is configured to create a non-equilibrium plasma producing electric arc upon application of a high voltage (Continued)

potential across an arc initiating gap between the high voltage electrode and the ground electrode and wherein the system is configured such that the syngas, the one or more gasifying agent(s) and plasma producing electric arc come together concurrently in the reactor. In one embodiment of the invention, the non-equilibrium plasma system comprises two eccentric cylindrical manifolds configured to form a single inlet manifold, wherein the two eccentric cylindrical manifolds comprise a first eccentric cylindrical manifold for gasifying agent input and a second eccentric cylindrical manifold for syngas input. The invention also comprises a method for refining syngas wherein the non-equilibrium plasma system of the present invention combines the syngas, the air and the plasma-producing electric arc in the same region, which will co-exist in the same location.

8 Claims, 31 Drawing Sheets

(52) U.S. Cl.
CPC . *H05H 2001/3468* (2013.01); *H05H 2240/20* (2013.01); *H05H 2245/1215* (2013.01)

(56) References Cited

U.S. PATENT DOCUMENTS

| | | | | |
|---|---|---|---|---|
| 3,485,586 | A * | 12/1969 | Swaney | B01J 19/088 423/440 |
| 4,353,885 | A * | 10/1982 | Hoekje | B01J 4/001 204/164 |
| 4,606,799 | A | 8/1986 | Pirklbauer et al. | |
| 4,990,739 | A * | 2/1991 | Zaplatynsky | B05B 7/226 219/121.47 |
| 5,399,829 | A * | 3/1995 | Ogilvie | B01J 19/088 219/121.36 |
| 5,951,771 | A * | 9/1999 | Raney | C23C 16/4551 118/723 ER |
| 5,960,026 | A | 9/1999 | Nolting et al. | |
| 5,993,761 | A * | 11/1999 | Czernichowski | B01J 19/088 204/170 |
| 6,322,757 | B1 * | 11/2001 | Cohn | B01J 19/088 123/3 |
| 6,657,079 | B1 * | 12/2003 | Mitsumoto | C07C 45/33 366/165.1 |
| 6,924,608 | B2 | 8/2005 | Czernichowski et al. | |
| 7,417,385 | B2 | 8/2008 | Czernichowski et al. | |
| 7,867,457 | B2 | 1/2011 | Gutsol et al. | |
| 8,110,155 | B2 | 2/2012 | Fridman et al. | |
| 8,350,190 | B2 * | 1/2013 | Hartvigsen | H05B 7/08 219/383 |
| 8,475,551 | B2 | 7/2013 | Tsangaris et al. | |
| 8,603,403 | B2 | 12/2013 | Gutsol et al. | |
| 2002/0100751 | A1* | 8/2002 | Carr | B23K 1/206 219/209 |
| 2002/0179575 | A1* | 12/2002 | Fornsel | H05H 1/34 219/121.5 |
| 2003/0051992 | A1* | 3/2003 | Rappa | B01J 19/088 204/164 |
| 2003/0087530 | A1* | 5/2003 | Carr | C23C 16/0245 438/710 |
| 2003/0113481 | A1* | 6/2003 | Huang | C23C 14/0623 427/580 |
| 2006/0102606 | A1* | 5/2006 | Twarog | H05H 1/34 219/121.82 |
| 2006/0267503 | A1* | 11/2006 | Bystriskii | G21B 1/052 315/111.21 |
| 2007/0187372 | A1* | 8/2007 | Rabinovich | B01J 6/008 219/121.36 |
| 2008/0106202 | A1* | 5/2008 | Du | H01J 37/32009 313/618 |
| 2008/0149050 | A1* | 6/2008 | Shih | B01J 19/088 123/3 |
| 2009/0031988 | A1* | 2/2009 | Shiraishi | F01L 13/0026 123/406.19 |
| 2010/0078408 | A1* | 4/2010 | Liebold | H05H 1/28 219/121.5 |
| 2011/0048251 | A1* | 3/2011 | Bardenshtein | C23C 16/4415 99/451 |
| 2011/0107669 | A1 | 5/2011 | Carabin et al. | |
| 2011/0120006 | A1* | 5/2011 | Lenk | F17D 1/075 48/61 |
| 2011/0298376 | A1* | 12/2011 | Kanegae | B01J 19/088 315/111.51 |
| 2012/0193215 | A1 | 8/2012 | Fourcault et al. | |
| 2013/0064726 | A1* | 3/2013 | Morfill | A01J 7/04 422/186.21 |
| 2014/0020835 | A1* | 1/2014 | Nguyen | H01J 37/32733 156/345.37 |
| 2014/0021035 | A1* | 1/2014 | Rabinovich | B01J 19/088 204/170 |
| 2014/0102639 | A1* | 4/2014 | Nettesheim | C23C 16/045 156/345.28 |
| 2014/0154399 | A1* | 6/2014 | Weikart | A61M 5/3129 427/2.3 |
| 2014/0159572 | A1* | 6/2014 | Risby | H05H 1/30 315/39.51 |
| 2014/0232255 | A1* | 8/2014 | Foret | H05H 1/2406 313/231.41 |
| 2015/0041454 | A1* | 2/2015 | Foret | H05H 1/40 219/601 |
| 2015/0250044 | A1* | 9/2015 | Klochkov | H05F 3/06 361/213 |
| 2016/0102025 | A1* | 4/2016 | Nunnally | C05C 5/00 424/616 |
| 2016/0194202 | A1* | 7/2016 | Rabinovich | B01J 19/088 252/373 |
| 2017/0231078 | A1* | 8/2017 | Gomaa | H05H 1/48 |
| 2017/0287678 | A9* | 10/2017 | Foret | H01J 37/32018 |

FOREIGN PATENT DOCUMENTS

| | | |
|---|---|---|
| WO | 2008/104058 A1 | 9/2008 |
| WO | 2008138117 A1 | 11/2008 |
| WO | 2012023858 A1 | 2/2012 |

OTHER PUBLICATIONS

Materazzi et al., "Tar evolution in a two stage fluid bed-plasma gasification process for waste valorization", Fuel processing Technology, vol. 128, Dec. 2014, pp. 146-157.
International Search Report cited in PCT/CA2015/050980, dated Jan. 7, 2016, 6 pages.
Search Report issued in European Patent Application No. 15847394.2 dated Apr. 6, 2018, 8 pages.
X. Guofeng, et al., "Optimization geometries of a vortex gliding-arc reactor for partial oxidation of methane", Energy, 2012, pp. 333-339, vol. 47, No. 1.
Office Action issued for corresponding European application No. 15 847 394.2 dated Feb. 12, 2020, 5 pages.

* cited by examiner

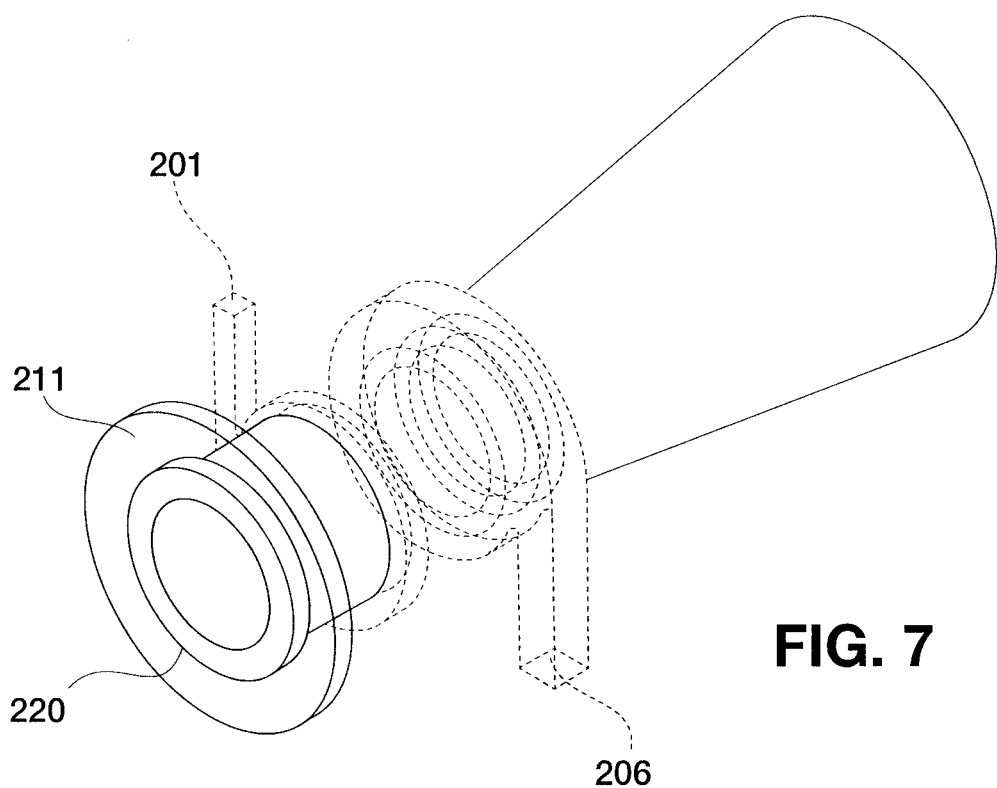
FIG. 7
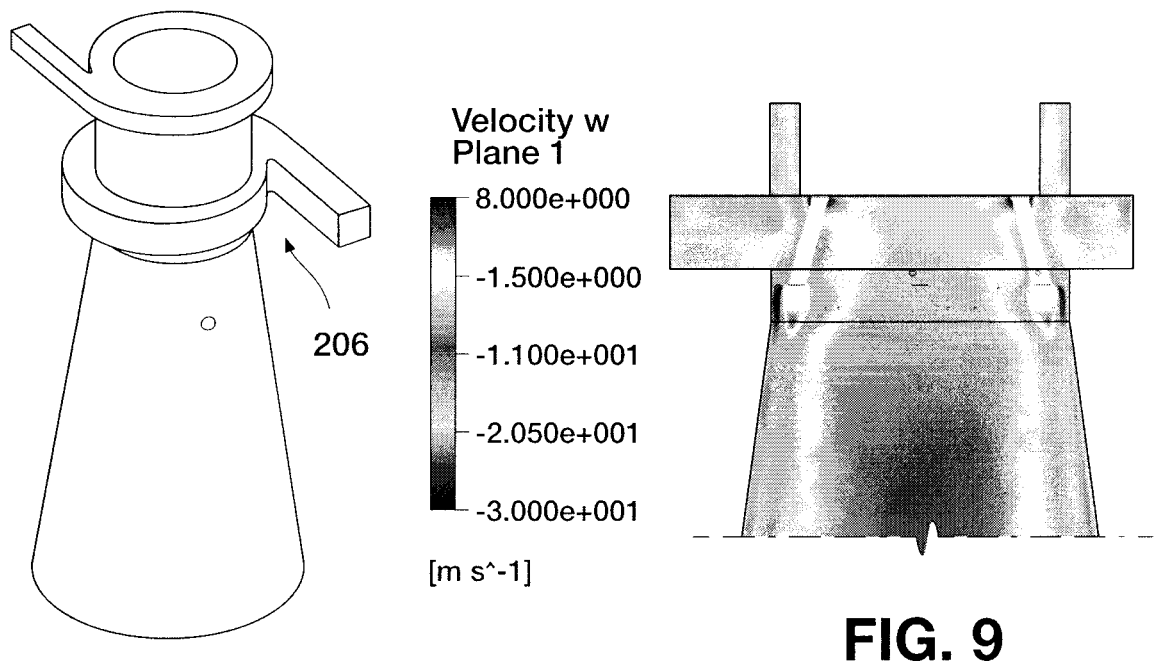
FIG. 8
FIG. 9

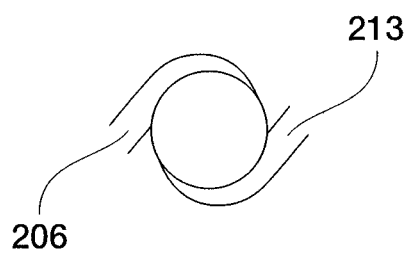
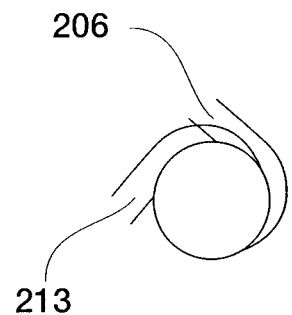
FIG. 14A					FIG. 14B
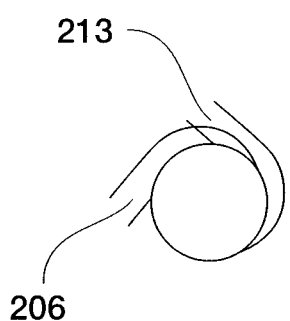
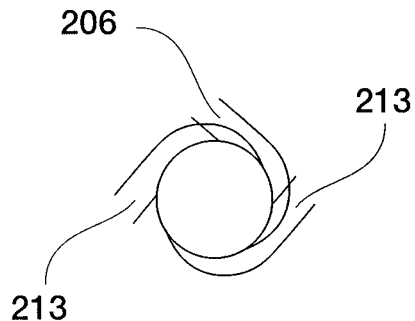
FIG. 14C					FIG. 14D
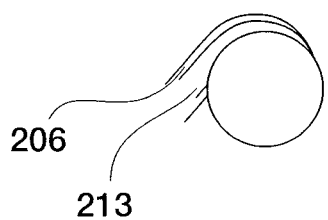
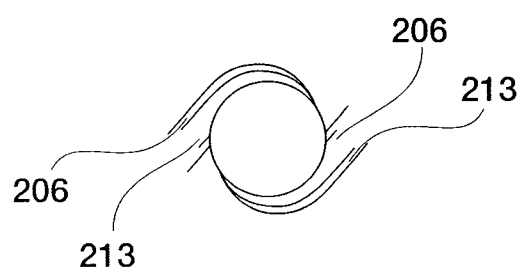
FIG. 14E					FIG. 14F

FIG. 26A  FIG. 26B

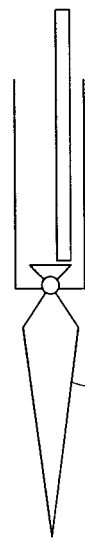
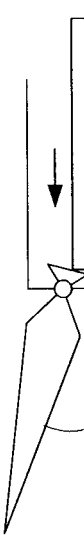
FIG. 29A        FIG. 29B
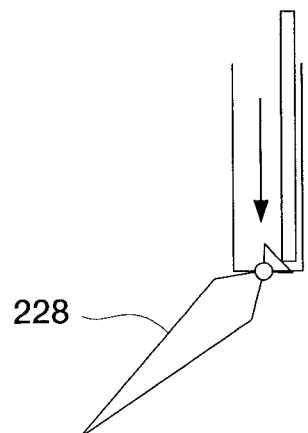
FIG. 29C

NON-EQUILIBRIUM PLASMA SYSTEM AND METHOD OF REFINING SYNGAS

CROSS REFERENCE TO RELATED APPLICATION

This application is a 35 U.S.C. 371 National Phase Entry Application from PCT/CA2015/050980, filed Sep. 30, 2015, which claims the benefit of U.S. Ser. No. 62/057,383 filed on Sep. 30, 2014, the disclosure of which are incorporated by reference in their entirety.

FIELD OF THE INVENTION

This invention pertains to the field of syngas refinement. In particular, it relates to a system and method of refining syngas using non-equilibrium plasma.

BACKGROUND TO THE INVENTION

Syngas produced via the gasification of carbonaceous feedstock often includes a significant tar component. The tar component can include benzene, toluene, naphthalene, pyrene and indene, among others. These tars present a major concern in commercial gasification facilities as they clog and foul downstream equipment.

The destruction and/or removal of contaminating tars can be difficult with the effectiveness of tar removal strategies dependent on process parameters and the individual molecules. Simulations of thermal conversion of benzene, toluene and naphthalene have been reviewed in the literature and suggest that both significant residence times and elevated temperatures (as high as 1250° C.-around 1523 K) are necessary to obtain high levels of tar conversion.

A number of studies have examined the use of plasma to crack tar. For energy conversion processes, such as conversion of hydrocarbons into syngas, the best results have been obtained in non-thermal plasma (NTP) systems that utilize "warm", gliding-arc plasmas, with gas temperatures in the 2,000 K-4,000 K range.

Plasma reforming of tars, modeled typically with naphthalene or toluene, has been studied using a variety of discharges including microwave, corona and gliding arc discharges. Although these studies demonstrated high removal efficiencies, their undesirable attributes, namely high specific energy input, unrealistic input gas, low tar concentration, low flow rate, and low energy efficiency, make them undesirable for industrial application.

Non-equilibrium plasma systems are known from the art and include those described in U.S. Pat. Nos. 8,603,403; 8,110,155; 7,867,457; 8,618,436; 5,960,026; 6,924,608; and 7,417,385, as well as Chinese patent 201722188 and French patent FR2775864.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a non-equilibrium plasma (NEP) system and method of refining syngas. In accordance with an aspect of the present invention, there is provided a non-equilibrium plasma system for refining syngas, the system comprising a reactor having one or more inlet manifolds configured to promote an axially symmetric and swirling flow pattern, into which syngas and one or more gasifying agents are introduced for processing within the reactor, a high voltage electrode; and a ground electrode, wherein the system is configured to create a non-equilibrium plasma producing electric arc upon application of a high voltage potential across an arc initiating gap between the high voltage electrode and the ground electrode and wherein the system is configured such that the syngas, the one or more gasifying agent(s) and plasma producing electric arc come together concurrently in the reactor.

In accordance with another aspect of the invention there is provided a non-equilibrium plasma system comprising a hollow chamber having a first end and a second end; wherein the gas outlet is proximal to the second end; two eccentric cylindrical manifolds configured to form a single inlet manifold into the chamber proximal to the first end, the two eccentric cylindrical manifolds comprising a first eccentric cylindrical manifold for gaseous process additive input and a second eccentric cylindrical manifold for syngas input; a high voltage electrode; and a ground electrode, wherein the system is configured to create a spiral gas flow pattern in the chamber; and wherein the system is configured to create a non-equilibrium plasma discharge upon application of a high voltage potential across an arc initiating gap between the high voltage electrode and the ground electrode.

In accordance with another aspect of the invention, there is provided a method of refining a syngas, comprising inputting syngas and a gasifying agent into a reactor such that there is an axially symmetric and swirling flow pattern; wherein the reactor has a high voltage electrode; and a ground electrode and is configured to create a non-equilibrium plasma producing electric arc upon application of a high voltage potential across an arc initiating gap between the high voltage electrode and the ground electrode; applying a high voltage potential across the arc initiating gap thereby creating the non-equilibrium plasma.

BRIEF DESCRIPTION OF THE DRAWINGS

Embodiments of the invention will now be described, by way of example only, by reference to the attached Figures, wherein:

FIG. 1 shows raw syngas (A), the non-equilibrium plasma (B), gasifying agent (C), mixing point (D), reactor vessel (E) and refined syngas out (F).

FIGS. 6A-6F start sequentially at the top of the torch and move incrementally to the bottom of the torch, showing cross section temperature profiles of each incremental layer. It can be noticed that the temperature profile is stable from top to bottom.

FIGS. 7 and 8 show 3-D views of the conical first end of one embodiment of the non-equilibrium plasma system detailing the raw syngas inlet port 206 the gasifying agent inlet port 201, additional air or additives inlet port(s) (not shown) may be provided. Also shown in FIG. 7 is the high temperature thermal and electrical insulation 211.

FIGS. 9 and 10 disclose a vertical section of one embodiment of the non-equilibrium plasma system showing its temperature profile.

FIGS. 14A-F depict various configurations of inlet options that can be employed within the invention, showing the syngas inlet port(s) 206 and gasifying agent inlet port(s) 213.

FIG. 17K represents an airfoil shape showing a streamlined ring to eliminate any recirculation zone behind the ring.

FIG. 18 also shows the inner space 217 and legs 218, while FIG. 19 shows the high voltage electrode body 209.

FIG. 21A shows a pin-geometry. FIGS. 21B and 21C show spiral and triangular geometries, respectively.

FIG. 24A shows the electrical voltage being transferred from the high voltage electrode 230 to the rotating shaft 203 via magnetic coupling 226. FIG. 24B shows the electrical voltage transfer from the high voltage electrode 230 to the shaft 203 via wire brushing against the shaft as it spins, where the wire brushes are 227. Both FIGS. 24A-B show the rotating electrode 228 and the packing gland seal for the rotating shaft 229.

25-A the fork is straight and its distance from the frustum shaped portion 223 increases the farther down the torch the arc travels. In FIG. 25-B the distance between the fork-shaped high voltage electrode 230 and the inner reactor wall/frustum shaped portion 223 is kept constant.

FIGS. 26A-B show a partial view of one embodiment of the non-equilibrium plasma system having the rotating pin design for the high voltage electrode. Also shown is the grounded motor 234 providing torque to rotate the shaft 203 and the high voltage electrode 230. FIG. 26A shows planetary gears 231 in a box, as the method of transferring voltage from the high voltage electrode 230 to the rotating shaft 203. In FIG. 26B the gears 231 may be beveled for better stability and greater lifetime.

FIGS. 29A-C illustrate an embodiment where the angle of the rotating electrode 228 can be adjusted using an internally contained, simple lever based mechanical system.

FIGS. 35A-B shows the syngas inlet port 206 and the gasifying agent inlet port(s) 213.

DETAILED DESCRIPTION OF THE INVENTION

Definitions

Figure 1:
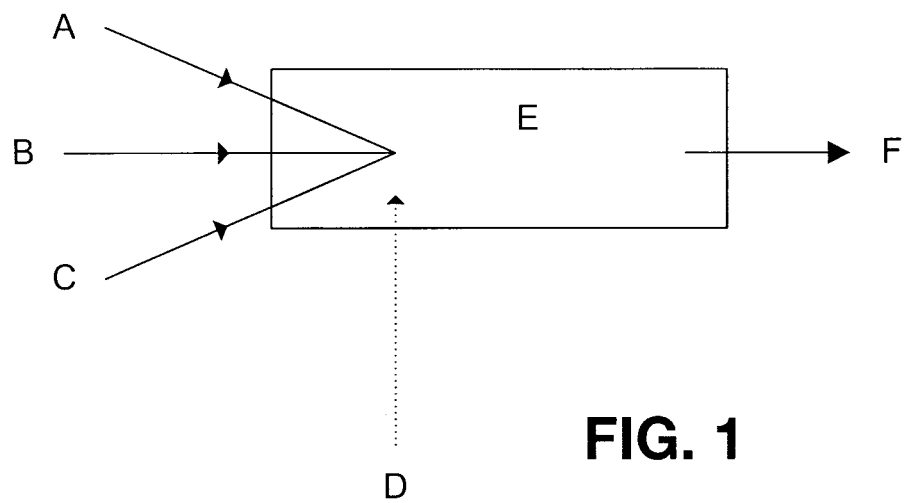
FIG. 1 illustrates a non-equilibrium plasma (NEP) system for syngas refining configured such that the syngas, the one or more gasifying agent(s) and plasma producing electric arc come together concurrently in the reactor. In particular.
Figure 2:
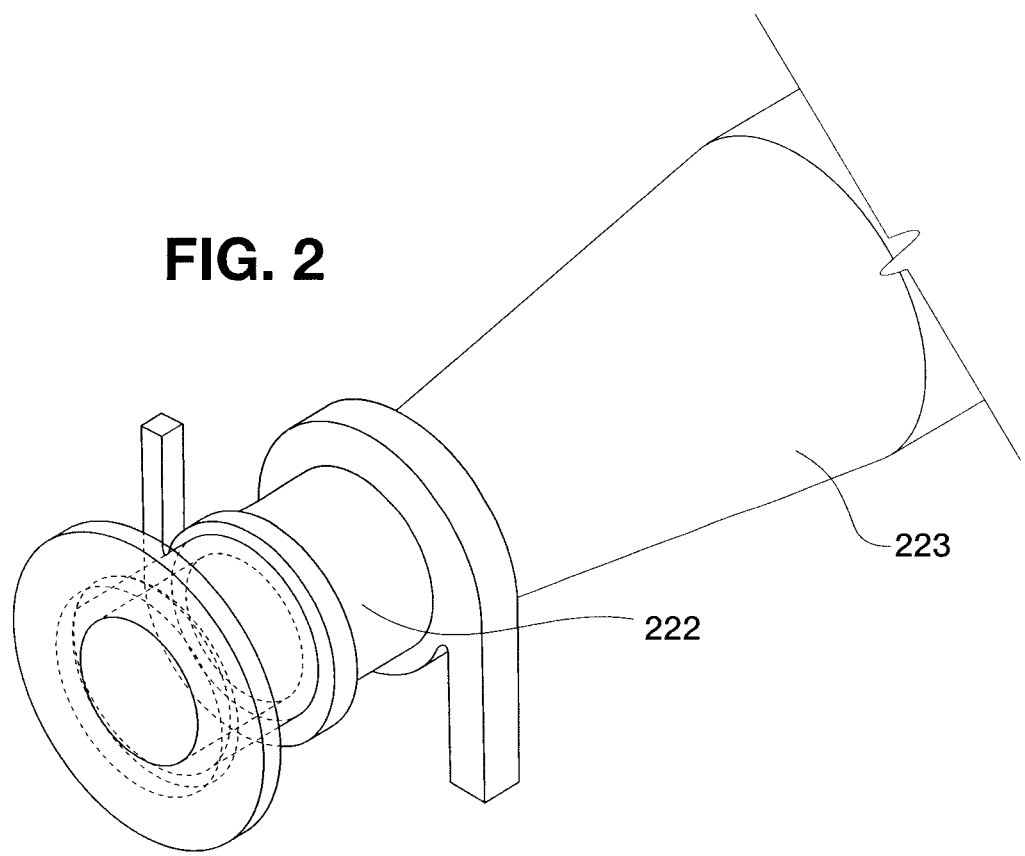
FIG. 2 illustrates a 3-D view of one embodiment of the non-equilibrium plasma system for refining syngas, detailing the reactor entrance tube 222 and frustum expansion of the torch, which houses the ground electrode 223.

Unless defined otherwise, all technical and scientific terms used herein have the same meaning as commonly understood by one of ordinary skill in the art to which this invention belongs.

As used herein, the term "raw syngas" means generally, a gas generated during the gasification process that has not been treated.

As used herein, the term "tar" means high molecular weight hydrocarbons which are generally defined as the downstream condensable hydrocarbon component in the product gas.

As used herein, the term non-equilibrium plasma (NEP) or non-thermal plasma (NTP), or "cold plasma", or "low-pressure plasma" means plasma that has a slight thermal component to the gas; while, it mainly has a catalytic effect on the gas/particles components. Non-equilibrium plasma is generated in a high-voltage electric field. Furthermore, non-equilibrium plasma has much higher energy distribution to the electrons, which have a temperature of approximately 10,000 Kelvin, while heavy particles have a temperature in the range of 300-4000 Kelvin. Some examples of non-equilibrium plasma discharge include: dielectric barrier discharge, pulsed corona discharge, and gliding arc discharge. All of these plasma discharges have properties such that electron energy (temperature) is significantly higher than the energy (temperature) of other plasma particles; hence, it is a non-equilibrium discharge.

As used herein, the term "gasifying agent" means air, $O_2$, enriched air, steam, $CO_2$, $O_3$, $H_2S$, $H_2O_2$ and combinations of thereof.

Overview of the System

This invention provides a non-equilibrium plasma (NEP) system and method of refining syngas. According to embodiments, the non-equilibrium plasma system comprises a reactor with a hollow chamber having one or more inlet manifolds that are configured to promote an axially symmetric and swirling flow pattern in inputted gas. The raw syngas and one or more gasifying agents are introduced for processing within the reactor through the one or more inlets. The system further comprises a high voltage electrode; and a ground electrode and is configured to create a non-equilibrium plasma producing electric arc upon application of a high voltage potential across an arc initiating gap between the high voltage electrode and the ground electrode. The system is further configured such that the syngas, the one or more gasifying agent(s) and plasma producing electric arc come together concurrently in the reactor.

The invention also provides a method for refining syngas using the non-equilibrium plasma system of the present invention combines the syngas, the air and the plasma arc in the same region, which will co-exist in the same location.

According to embodiments, the non-equilibrium plasma system comprises two eccentric cylindrical manifolds configured to form a single inlet manifold for syngas input. The system further comprises of a similar set of two eccentric cylindrical manifolds, in a different plane that forms the inlet manifold for the air feed into the reactor.

Although most of the description will refer to the two inlet embodiments, it should be understood that the system can be configured to include more than two inlets. In embodiments, where the non-equilibrium plasma inlet manifold comprises more than two inlets, eccentric or co-centric configurations are contemplated.

The invention provides a non-equilibrium plasma (NEP) system for refining raw syngas. The non-equilibrium plasma system is configured to promote an axially symmetric and swirling flow pattern in the reactor, into which raw syngas and gasifying agents are introduced for processing. The raw syngas, gasifying agent(s) and plasma come together concurrently or simultaneously within the reactor.

The axially symmetric and swirling flow pattern is provided by the configuration the non-equilibrium plasma systems. The non-equilibrium plasma system comprises a reactor or reactor chamber having one or more inlet manifolds configured to promote an axially symmetric and swirling flow pattern, into which syngas and one or more gasifying agents are introduced for processing within the reactor, a high voltage electrode; and a ground electrode During operation of the non-equilibrium plasma system temperature distribution and flow field within the reactor is axially symmetric and/or uniform thereby avoiding or reducing thermal stresses and/or distortion due to difference in temperatures.

In some embodiments of the non-equilibrium plasma system, the system is configured such that reactor wall temperature is lower than its melting point with a higher temperature reaction zone located towards the core of the reactor. In some embodiments, the wall of the reactor is protected by a thin film of lower temperature reactant stream eliminating the need to use other cooling schemes and/or fluids to maintain wall stability. In some embodiments, alternative means of cooling the reactor walls may be employed. Optionally, thermionic cooling is utilized to minimize or eliminate external cooling requirements.

In one embodiment, the inlet port of the non-equilibrium plasma system is channeled and comprises two eccentric cylindrical manifolds for the raw syngas inlet port, and gasifying agent input inlets; are mixed together in the reactor at sub-stoichiometric ratios Accordingly to embodiments, the non-equilibrium plasma system is configured to provide a stable non-equilibrium plasma arc and/or long electrode life at varying process flow rates. Optionally, the non-equilibrium plasma system includes low maintenance of gas channels and/or is designed to provide a low process pressure drop for operability and to increase efficiency of the process.

According to some embodiments, the system is configured to reduce or eliminate higher process gas pressure drop, torch instability and loss of arc attachment at higher flows, and uneven gap distance throughout a run thereby pushing the torch towards the thermal regime. One of skill in the art would appreciate that the ground electrode and the high voltage electrode may have their dimensions and geometry to create the arc initiating gap.

The non-equilibrium plasma systems comprises a reactor or reactor chamber having one or more inlet manifolds configured to promote an axially symmetric and swirling flow pattern, into which syngas and one or more gasifying agents are introduced for processing within the reactor, a high voltage electrode; and a ground electrode. The system is configured such that a non-equilibrium plasma producing electric arc is produced upon application of a high voltage potential across an arc initiating gap between the high voltage electrode and the ground electrode. Various configurations of electrodes can be used in the non-equilibrium plasma system. In certain embodiments, the high voltage electrode is configured to avoid a stagnant zone or a zone where the arc develops in the absence of gas flow.

In an embodiment, the non-equilibrium plasma systems also comprises two or more inlet manifolds, where the inlets can be distributed over one or more geometric planes Optionally, the ground electrode is the reactor side or outer wall portion of the vessel or component thereof. In some embodiments, it has a frustum shaped section, which is the point of attachment of the arc.

Figure 12:
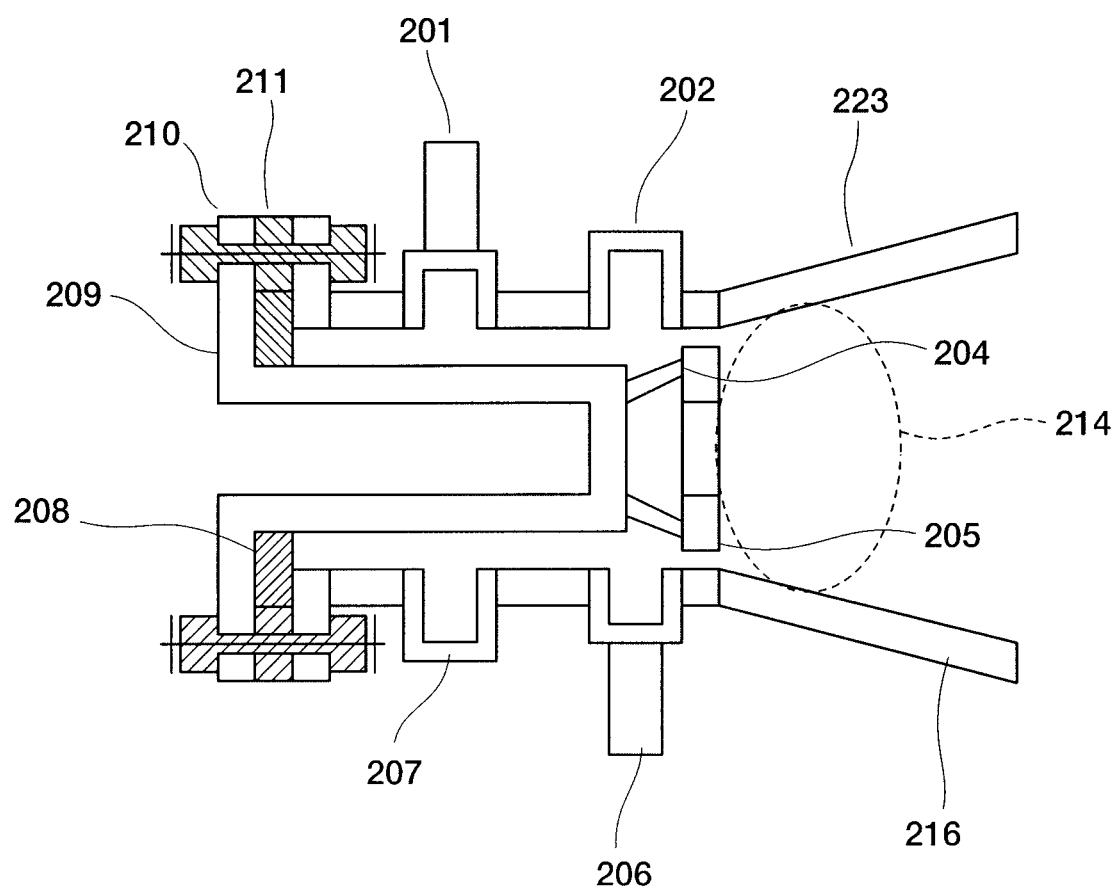
FIG. 12 illustrates a detailed cross-sectional view of the first end of the non-equilibrium plasma system of FIGS. 1 to 4 detailing the raw syngas inlet port 206, electrical insulation/gasketing 211 and the frustum shaped section of the reactor with ground electrode 223. Also illustrated is the gradual enlargement in cross section area downstream of the gas mixing region 214. The high voltage electrode ring 204 the reactor outer wall 216, gasifying agent inlet port 201 and the two eccentric cylindrical manifolds (202 and 207) are also shown. High voltage electrode ring 204, an extension of the high voltage electrode body 209, at which arc is initiated and attached during normal operating conditions; gap for arc initiation 205; high temperature thermal and electrical insulator 208: a ceramic piece backing the main insulator for thermal insulation and the electrical insulation/gasketing 211: an electrically non-conductive insulator that is used as a gas sealant/gasket as well; held together by an insulation bolt for flange 210 are also shown. Also shown is gas mixing region 214. The gas mixing region is the volume in which the air, syngas and optionally any additives, are mixed together in the desired sub-stoichiometric volumes. The insulation bolt for flange 210 is the fastener that attaches the high voltage electrode body 209 to the frustum shaped section of the grounded electrode 223.
Figure 13:
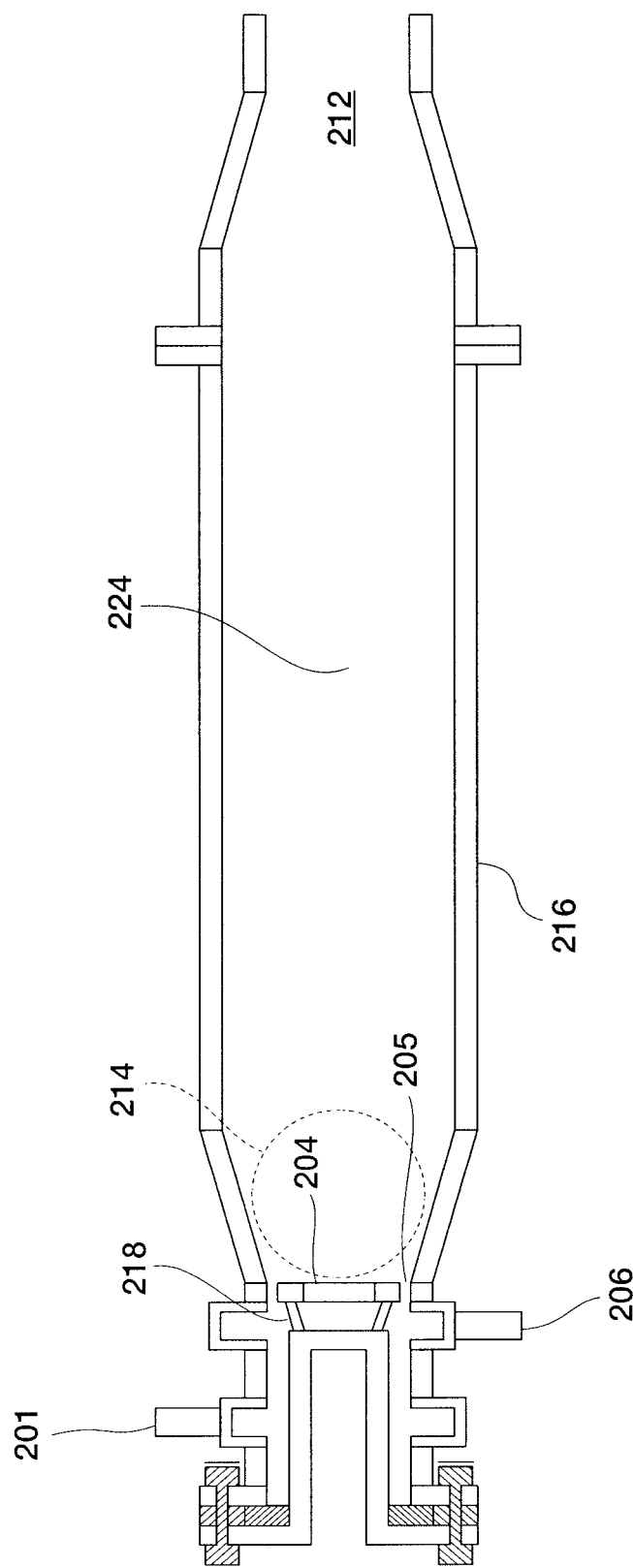
FIG. 13 is a sectional view of one embodiment of the non-equilibrium plasma system detailing the gasifying agent inlet port 201, legs 218, which can be tapered or angled electrode standoffs connecting the electrode body to the high voltage electrode ring 204. The arc initiation gap 205, raw syngas inlet port 206, and refined gas outlet 212 are also shown.
Figure 13A:
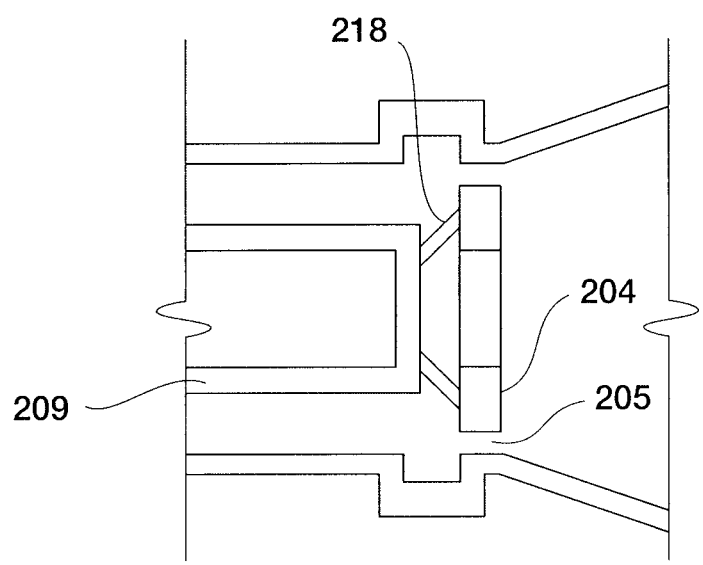
FIG. 13A shows an expanded view of the high voltage electrode ring. In some embodiments, the legs 218 to high voltage ring 204 are angled to facilitate obtaining the optimum distance for the arc initiation gap 205. It is also showed the high voltage electrode body 209. Also shown is high temperature thermal and electrical insulator 208. The insulator is a ceramic piece providing thermal insulation between the high temperature process downstream of the gas mixing region 214 and the relatively lower temperature processes upstream from the reactant entrance tube 222.
Figure 15:
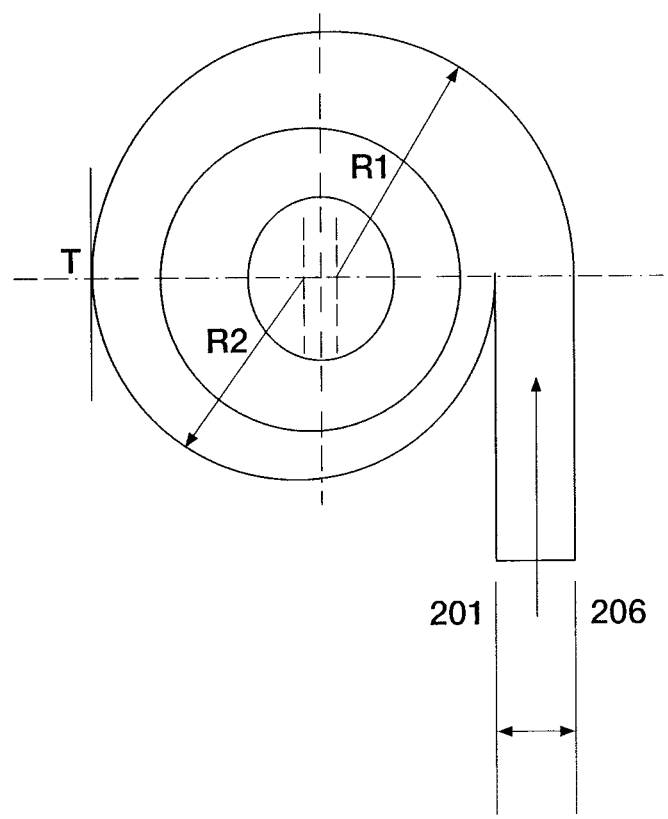
FIG. 15 shows a simplified view of the tangential gas entry (T) into the reaction chamber, which can be a gasifying agent inlet port 201 or a raw syngas inlet port 206. R1 and R2 are the centers of the two eccentric partial-cylinders that comprise the walls of the inlet manifold.
Figure 16A:
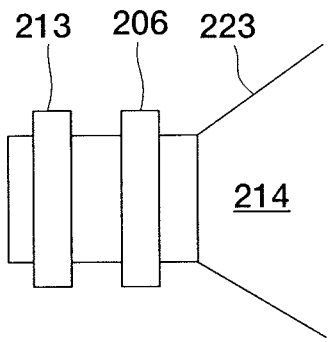
FIGS. 16A-D represents various configurations of inlet options that can be employed with the non-equilibrium plasma system. The raw syngas inlet port 206, gasifying agent inlet ports 213 and the gas mixing region 214 are shown.
Figure 16B:
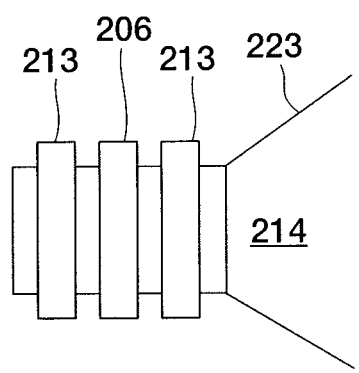
Figure 16C:
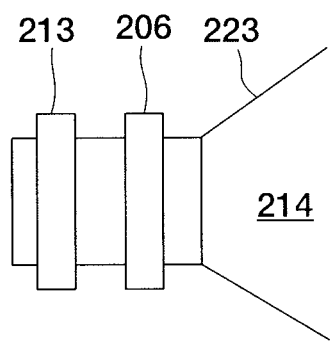
Figure 16D:
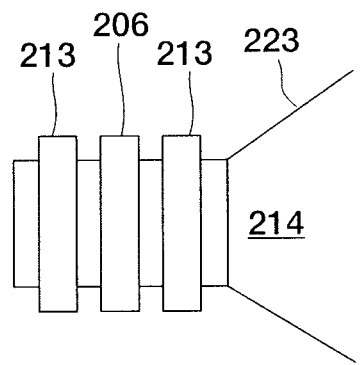
Figure 17A:
FIGS. 17A-K represent illustrative geometries of the high voltage electrodes for use in the non-equilibrium plasma system, wherein 17A is square; 17B is circular, 17C is square with round corners, 17D is parabolic, 17E represents a vertically oriented rectangular shape, 17F represents a vertically oriented elliptical or oval shape, 17G represents a horizontally oriented rectangular shape, whose gap may be smaller; 17H represents a horizontally oriented elliptical or oval shape, 17I and 17J represent oriented vertical extended versions of 17C and 17D, respectively.
Figure 17F:
Figure 17B:
Figure 17G:
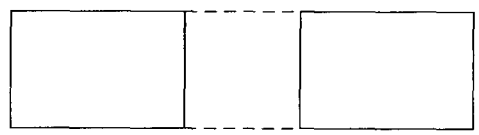
Figure 17C:
Figure 17H:
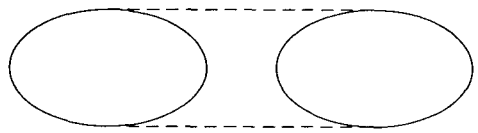
Figure 17D:
Figure 17I:
Figure 17E:
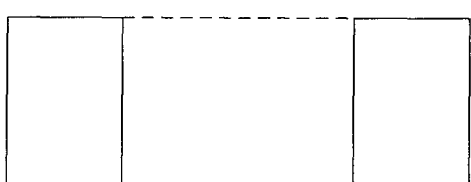
Figure 17J:
Figure 17K:
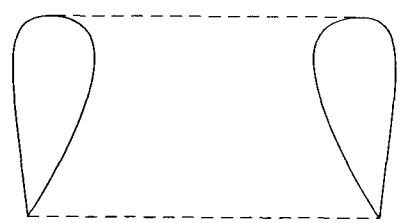

Referring to FIG. 12, syngas enters into the reactor from upstream processes via the syngas inlet port 206. The syngas inlet port 206 is operatively associated with the syngas eccentric cylindrical manifold 202. Gasifying agents including air, enter the reactor via the gasifying agent inlet port 201 and are channeled through the corresponding eccentric cylindrical manifold 207.

Referring to FIGS. 14 and 16, in some embodiments, there are additional air or additive inlet ports 213. The additional air or additives may be used to optimize the chemical and electrochemical characteristics of the process.

In one embodiment, the non-equilibrium plasma system is configured to be less susceptible to clogging. Optionally, this is accomplished by providing an eccentric inlet for the syngas inlet port.

According to some embodiments, the raw syngas is injected tangentially in order to generate a high swirling flow filed inside the torch.

Figure 4:
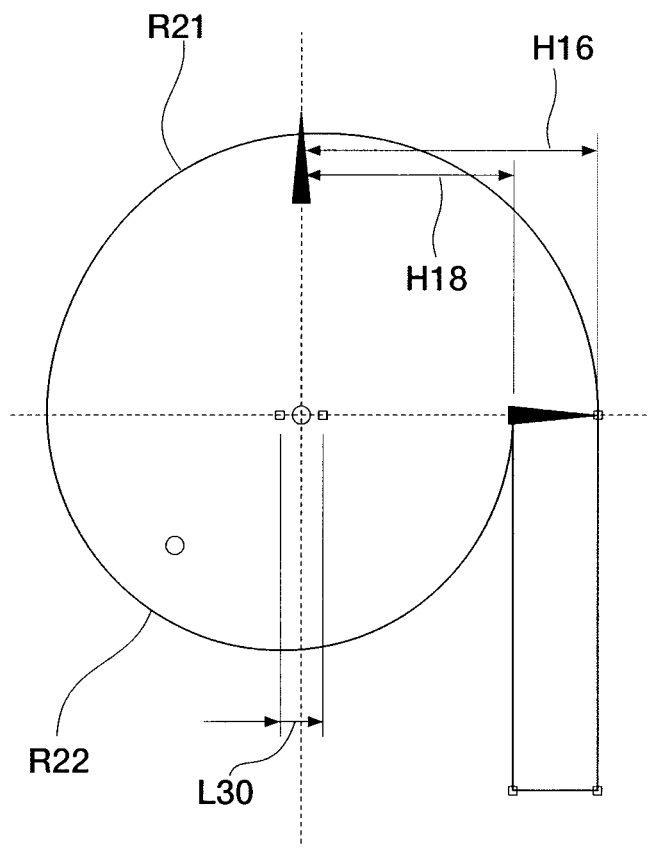
FIG. 4 shows a schematic of one embodiment of the syngas inlet showing the eccentric cylinders with different diameters R21 and R22. The offset between the diametric centers of the two cylinders is represented by L30.

Referring to FIG. 7, in some embodiments in order to create the swirling flow within the chamber, the syngas inlet port 206 has to be designed to introduce the gas in a swilling flow pattern that is off center from the geometric center of the reactor vessel Referring to FIG. 4, according to some embodiments, the cross section where the syngas is introduced comprises two eccentric cylinders having two different diameters R21, R22. The offset between the diameters is represented by L30 in FIG. 4. The entrances H16, H18 balance the eccentricity in the flow field and results in an axis symmetric flow downstream of the entrance. The same entrance is used for the air inlet and the air is injected tangentially into eccentric cylinders R21, R22 having different diameters.

Figure 5:
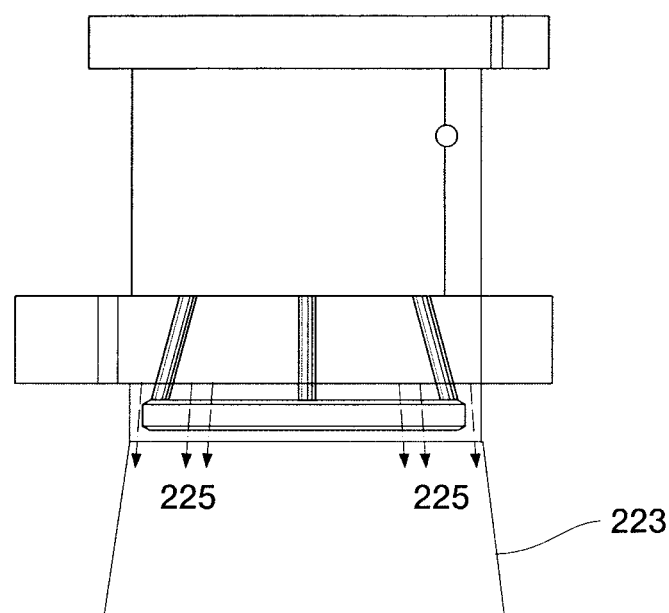
FIG. 5 shows a view of the syngas flowing through or around the electrode end, which can have different geometries, such as a ring, tips, pin, fork, wire, coil or blades (air foil).
Figure 6A:
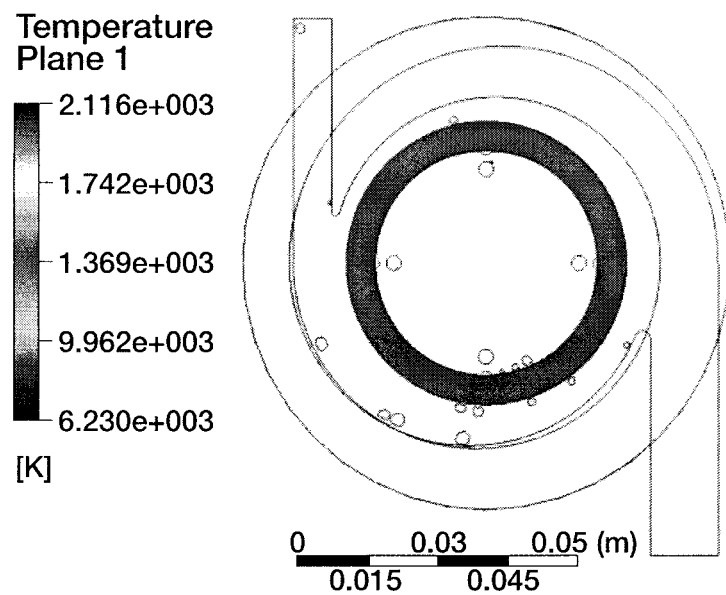
FIGS. 6A-6F shows profiles of high temperature combustion zone formed inside one embodiment of the non-equilibrium plasma system and downstream therefrom.
Figure 6B:
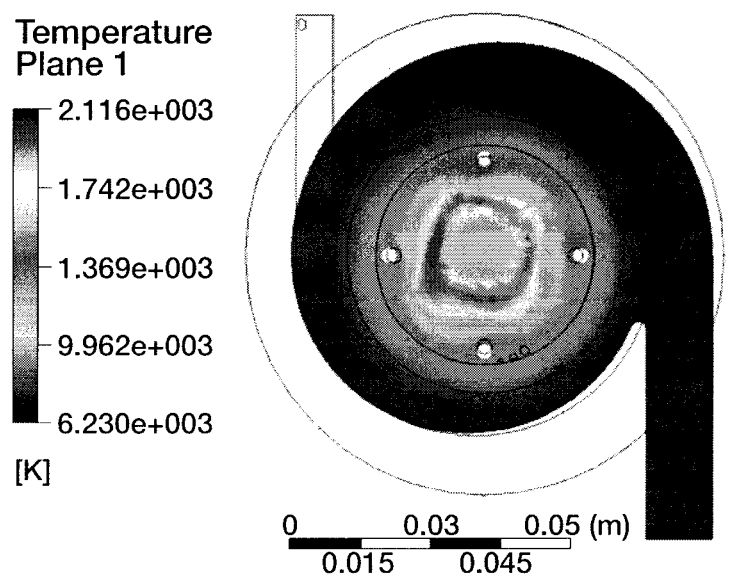
Figure 6C:
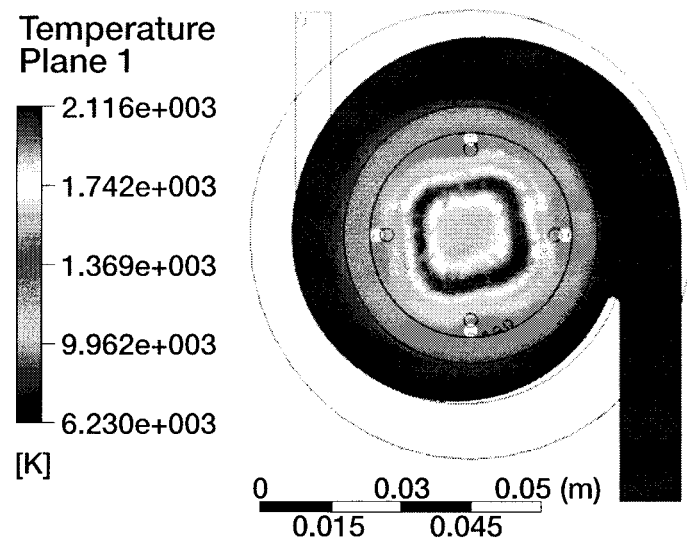
Figure 6D:
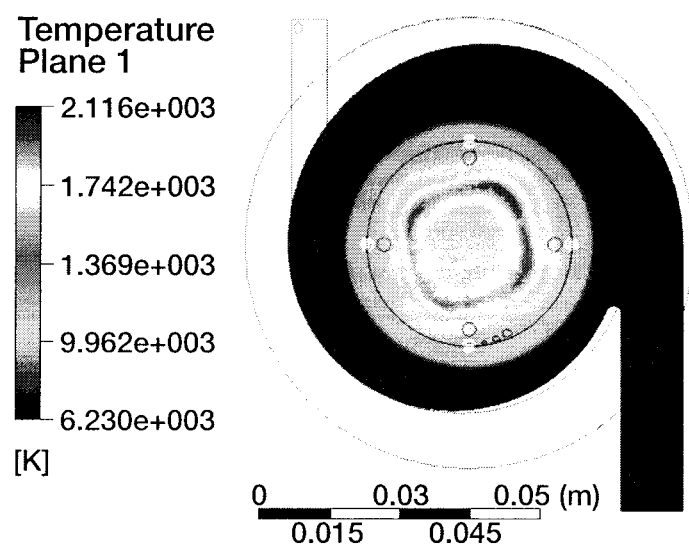
Figure 6E:
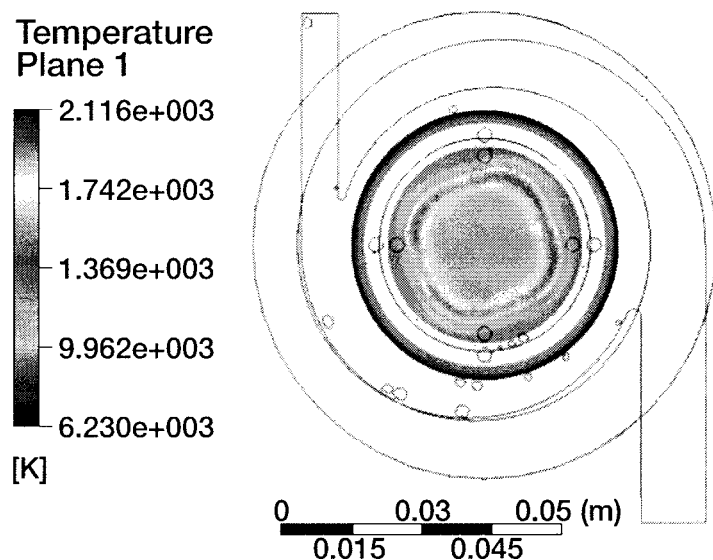
Figure 6F:
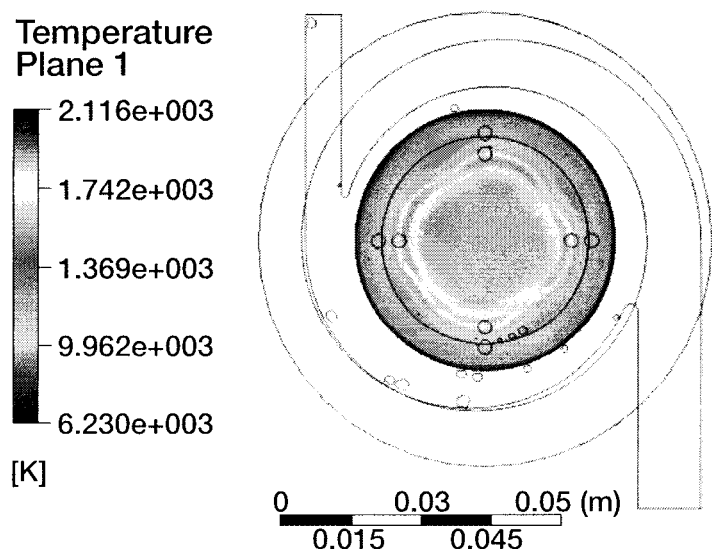

In some embodiment, the non-equilibrium plasma system is configured to minimize pressure drop experienced by the process gas, optionally this may be accomplished by allowing the syngas mixture to freely flow around and through the high voltage ring and not being confined in the section between the ring and the torch (FIG. 5).

Referring to FIGS. 12 and 16, in some embodiments there is provided one or more high temperature process air inlet(s) 201 (FIG. 12) and 213 (FIG. 16). It is known that mixing the syngas and air upstream of the plasma arc results in a loss in the synergistic effect of having radicals generated from the partial conversion process coinciding with the excited molecules and electrons produced by the plasma arc. Accordingly in some embodiments, the non-equilibrium plasma system is configured such that the gasifying agent and raw syngas come together at the main reaction zone 214 in proximity to the plasma arc (FIG. 12).

In some embodiments, the non-equilibrium plasma system is configured to reduce heat loss and thermal stress. Optionally, the non-equilibrium plasma system is configured to receive syngas that is not heated to high temperatures upstream from the system thereby avoiding heat loss and huge thermal stress to the inlet.

Figure 10:
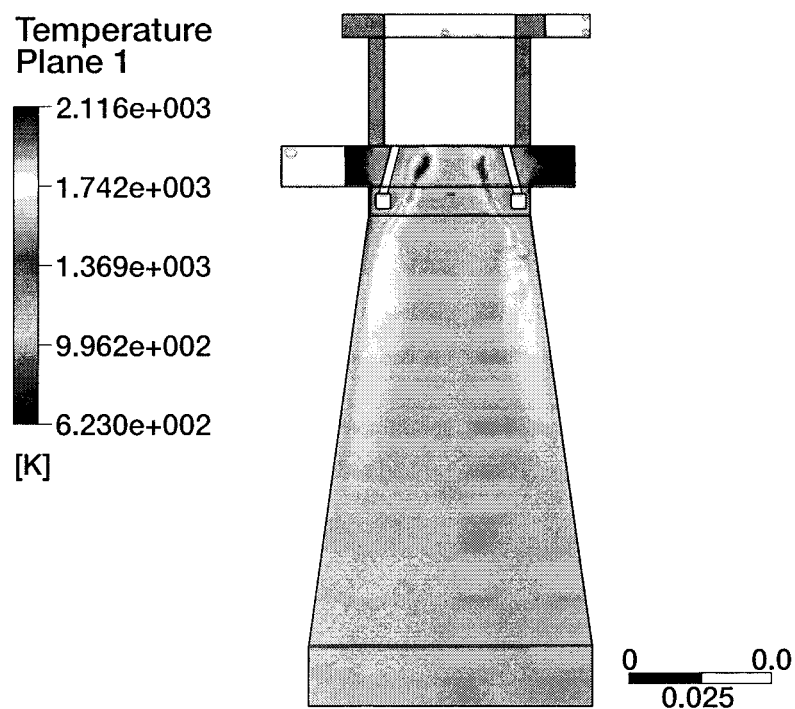

In some embodiments of the non-equilibrium plasma system, raw syngas enters at a much lower temperature and the high temperature combustion products are developed at or towards the center of the reactor, away from the walls and the syngas inlet (FIGS. 6, 9 and 10). In such embodiments, the reactor walls may be protected from the high temperature via a boundary layer of low temperature syngas. This boundary layer eventually mixes with the combustion products downstream, away from the intense heat of conversion. FIG. 10 shows that the high temperature combustion zone is formed away from the reactors walls, inside the reactor and not upstream of the reactor.

In such embodiment, the system does not need to inject any other flow to avoid soot accumulation on the insulation ring between the high and low voltage electrodes and it excludes the addition of cold air. Soot accumulation is prevented by using the process air as shield between the syngas and the insulation piece. The invention has eliminated the use of cooling air injection into the process, as doing so dilutes the syngas flow and results in energy loss and reduction in the lower heating value (LHV) of the process gas. The use of a liquid coolant has been eliminated because it reduces system temperature, thereby necessitating the need to add more process heat to maintain temperature, ultimately reducing the efficiency of the system. In other embodiments of the invention, such as those depicted in FIGS. 18 and 19, coolant flow 215 may be employed, if desired.

In one embodiment of the invention, process air pushes the raw syngas flow away from the insulating piece, which can be, for example, a Teflon™ piece. Therefore, for the purpose of protecting the electrical insulation/gasketing 211, a high temperature thermal and electrical insulator 208 is inserted between the Teflon™ and the air injection section (FIG. 12).

In another embodiment of the invention, the frustum shaped section of the grounded electrode 223 results in a better flow distribution inside the reactor. In addition, the creation of a recirculation zone and deceleration of the syngas axial velocity, lower the velocity, where the arc is stretched and less stable. In another embodiment, the expansion of the cross section of the reactor results in a small aspect ratio of length to diameter for the same volume, which results in less lateral surface area for the same volume (residence time) and consequently, less heat loss (FIG. 12).

In another embodiment of the invention the process air or gasifying agent is introduced through a frustum shaped section of the electrode 223, which is grounded (FIG. 12).

Electrodes

The non-equilibrium plasma system further includes a high voltage electrode; and a ground electrode wherein the system is configured to create a non-equilibrium plasma discharge upon application of a high voltage potential across an arc initiating gap between the high voltage electrode and the ground electrode.

In one embodiment, the high voltage electrode ring 204, which provides the voltage/current for the plasma arc formation; is operatively associated with the high voltage electrode body 209 via legs 218, and is sized to provide an arc initiating gap and is the location where the arc is initiated and attached during normal operational conditions. The reactor side or outer wall 216 serves as the ground (low voltage) electrode, or the region where the arc attaches itself, and in the illustrated embodiment is a frustum shaped section 223.

Figure 3:
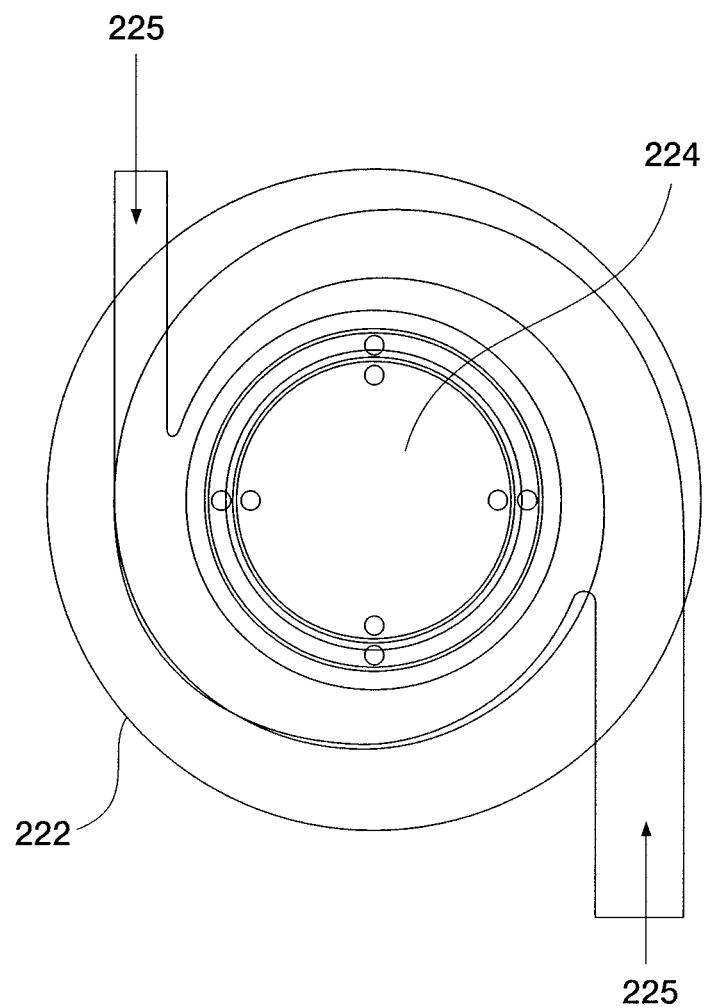
FIG. 3 is a cross-sectional view of the embodiment of the non-equilibrium plasma system shown in FIG. 2 at the level of the syngas inlet, showing the reactor entrance tube 222, the reaction chamber 224 and the gas flow 225.

Referring to FIG. 12, in the illustrated embodiment, the critical distance for the arc initiation gap 205 is the space between the high voltage electrode ring 204 and the reactor wall 206, the frustum shaped section of the grounded electrode 223 through which the process gas flows 225. In this embodiment, the geometry of the legs 218 to high voltage ring 204 and the dimension and geometry of the ring and legs can be adjusted to optimize the gap for arc initiation 205, to obtain specific process performance objectives (FIGS. 3 and 12).

The electrode insert of the non-equilibrium plasma system comprises a highly conductive material, such as graphite, carbon steel or stainless steel.

In another embodiment, the electrode insert comprises a high thermionic emissivity material such as hafnium, zirconium, tungsten, thorium, lanthanum, strontium, or alloys thereof.

In an embodiment of the invention, utilizing a rotating electrode 228, the packing gland seal 229 for the rotating shaft 203 keeps the process gas in the reaction chamber 224, and prevents their entry into the high voltage electrode body 209.

Figure 11:
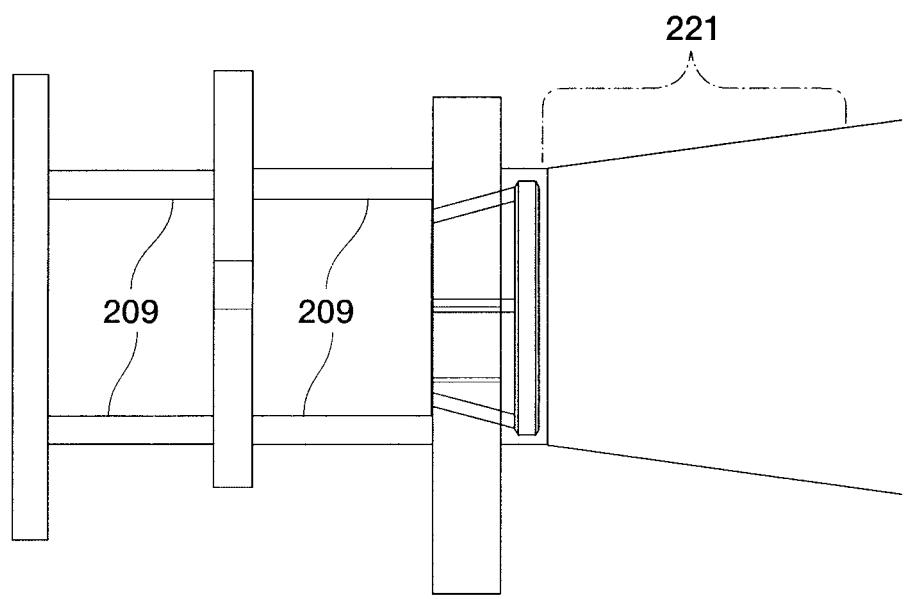
FIG. 11 is a partially cross-sectional view of one embodiment of the non-equilibrium plasma system detailing the high voltage electrode body 209 and approximate location of the plasma arc 221, which is developed in the reaction chamber. Also shown is the plasma arc region 221. This region is where the syngas-air flame is stabilized and sustained.

In one embodiment, the electrode is inverted, so that there is no hollow section inside the torch and the arc cannot develop inside the electrode (FIG. 11). Therefore, less cooling is required and the arc is efficiently utilized by forcing it to develop in the syngas flow. In other words there is no stagnant zone in the torch design of the current invention and the arc starts at the high voltage ring then pushed downstream via the syngas flow, providing for efficient energy use. the syngas flow, providing for efficient energy use. The legs 218 facilitate the arc formation by maintaining the desired arc initiation gap 205 between the electrode inner wall 219. The diameter of the electrode ring is engineered to be larger than the cylindrical part of the electrode so that the arc is always developed at the ring section of the high voltage electrode and not at the cylindrical section. The gap between the cylindrical section of the electrode and the torch walls is approximately double that between the ring and the torch wall. Besides, the cylindrical part of the electrode is coated with a thin film of electrically non-conducting material to ensure that no arcing occurs upstream of the ring.

In some embodiments, the non-equilibrium plasma systems avoids high voltage electrodes that are solid discs or cylindrical.

In some embodiments, the high voltage electrode is configured to avoid one or more of:

1. pressure drop by squeezing the whole stream through a narrow gap especially in the case of raw syngas containing high loads of particulate matter such as soot, salts and fly ash.
2. the flow going through a narrow gap will accelerate the flow axially and will partially disrupt the swirling flow pattern.
3. flow velocity in the arc initiation gap being higher than the flame speed thorough this gap. It is challenging to sustain a flame through this gap as the velocity of the gases going through this gap is accelerated as the gases gets squeezed through the gap. This acceleration in flow might blow off the flame, if developed upstream of the disc.
4. potentially causing the disc to melt or get corroded by the flame reactive radicals. If a flame is developed upstream of the disc and this flame somehow is sustained by means of making a larger gap, the high temperature corrosive combustion generated radicals will still have to be confined within a narrow gap causing the flame to be adjacent to the disc, potentially causing the disc to melt or get corroded by the flame reactive radicals.

In some embodiments, the high voltage electrodes are configured as follows:

The electrode end 200 (FIG. 32) can be a rotating electrode or a fixed electrode and different geometries, such as a ring, tips, pin, fork, wire, coil or blades (air foil).

The high voltage electrode rotation is axi-symmetric and the rotating electrodes 228 (FIGS. 24, 26, 27, 28, 29, 30) comprise one or more geometries of same or different lengths. They are axially off-set from each other.

Figure 32:
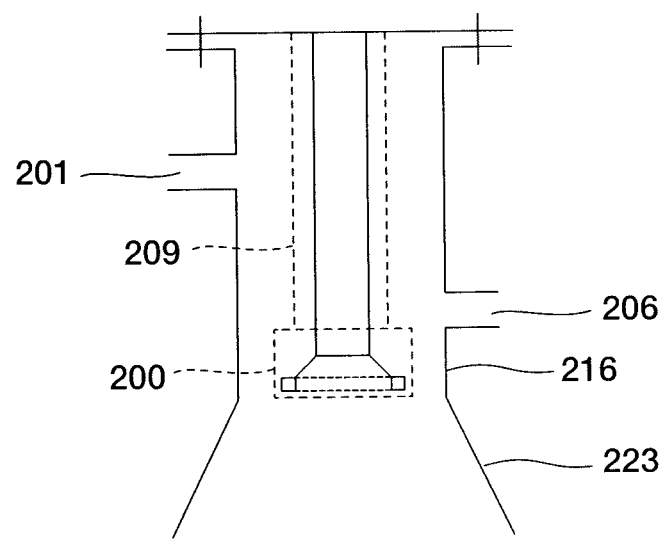
FIG. 32 shows a simplified geometry one embodiment of the non-equilibrium plasma system whereby it is made up of high voltage electrode body 209 and high voltage electrode end 200. Also shown are the gasifying agent inlet port 201, syngas inlet port 206, the outer wall 216 and the ground electrode 223.
Figure 33:
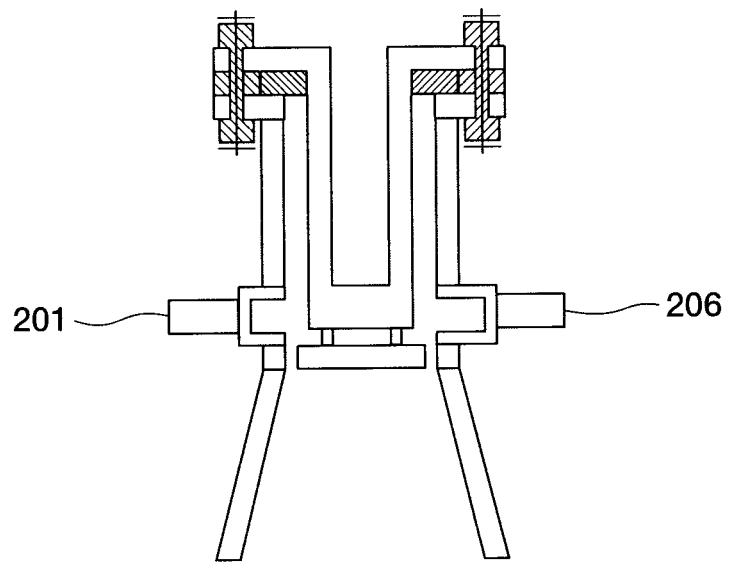
FIG. 33 shows one embodiment of the non-equilibrium plasma system with 2 uni-planar inlets 201 and 206. The inlets are 180 degrees from each other, in the same plane.
Figure 34:
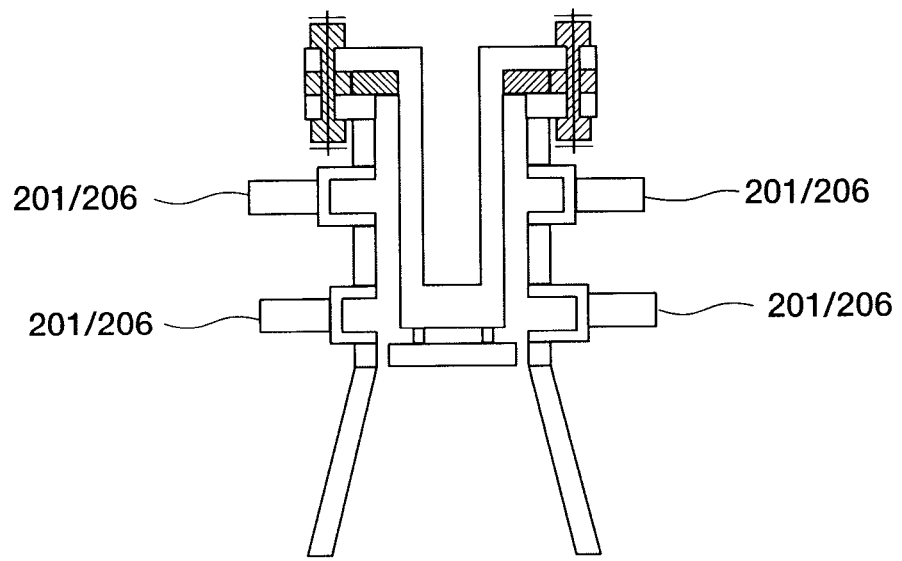
FIG. 34 shows one embodiment of the non-equilibrium plasma system with four inlets 201/206, two in each plane. These embodiments illustrate that there is no limit to the number of inlets that can be engineered to work with the reactor. The inlets can be multi-planar or uni-planar depending on the specific application.
Figure 35A:
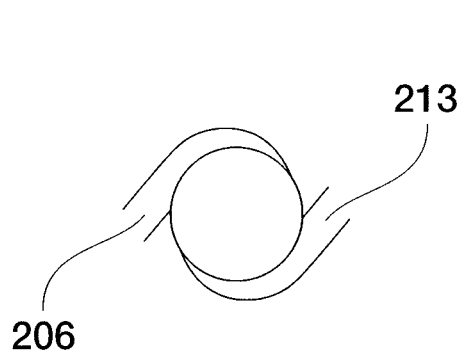
FIGS. 35A-B illustrates cross-sectional views of 2 and 3 uni-planar inlet configurations.
Figure 35B:
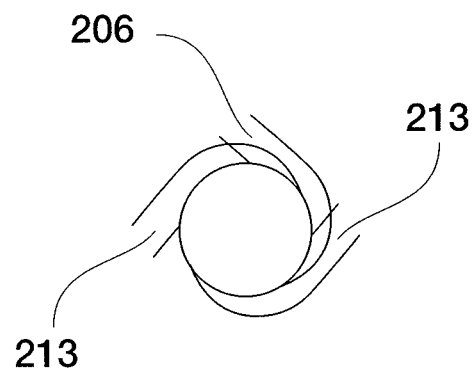

The diameter of the electrode end 200 is larger than the cylindrical part of the high voltage electrode body 209 (FIG. 32).

The arc is developed at the plasma arc region 221 (FIG. 11) after the arc initiation gap 205 (FIG. 12); the gap size between the cylindrical section of the electrode body 209 and the torch outer walls 216 is approximately double of the size between the electrode end 200, the outer walls 216 and frustum shaped portion of the low voltage electrode 223 (FIG. 12).

The cylindrical part of the high voltage electrode body 209 is coated with a thin film of electrically non-conducting material.

The electrode end 200 (FIG. 32) can be square, circular, square with round corners, parabolic, vertically oriented rectangular shape, vertically oriented elliptical or oval shape, horizontally oriented rectangular shape, horizontally oriented elliptical or oval shape among other formats.

In another embodiment, the electrodes comprise optional cooling pathways, where a coolant flows 215 through a channel between the high voltage electrode inner wall 219 and the high voltage electrode outer wall 233.

In an embodiment of the invention (FIGS. 18 and 19) that requires liquid cooling, the high voltage electrode body 209 is manufactured in a double walled configuration, wherein there is a coolant flow 215 between the outer wall 223 and inner wall 217.

Ring

In another embodiment of the invention, the high voltage electrode ring 204 (FIG. 12), can be of different geometries, optimized for the particular process.

FIGS. 17A-K represent illustrative geometries of these high voltage electrodes wherein 17-A is square; 17-B is circular, 17-C is square with round corners, 17-D is parabolic, 17-E represents a vertically oriented rectangular shape, 17-F represents a vertically oriented elliptical or oval shape, 17-G represents a horizontally oriented rectangular shape, whose gap may be smaller; 17-H represents a horizontally oriented elliptical or oval shape, 17-I and 17-J represent oriented vertical extended versions of 17-C and 17-D, respectfully.

FIG. 17-K represents an airfoil shape showing a streamlined ring to eliminate any recirculation zone behind the ring, which is important to avoid combustion and high temperature gases recirculation near the ring that might erode the ring.

Rotating Electrode

Although rotating electrodes are already known from the state of the art, as it was showed by Patents U.S. Pat. Nos. 6,924,608 and 7,417,385, they are different from the present invention, because current system uses a DC power supply versus a 3 phase AC power supply utilized by Czernichowski et al. Furthermore, current system utilizes the process gas flow to control the development and location of the plasma arc, while the referred patents use mechanical rotation as a method of controlling the arc.

Patent FR2775864A1 from Albin Czernichowski also describes a device used to mechanically stretching a gliding arc using a rotating electrode, but in the current system, the arc is glided/stretched by the momentum of syngas flow and not my mechanically moving the electrodes relative to each other.

The purpose of rotating the high voltage electrode the present invention is to avoid arcing at the same location every time the arc is restarted. The distance/gap between the high voltage electrode and the grounded torch body is always constant. The rotation of the high voltage electrode is only to make the arc start up location continuously changing and evenly distributed around the grounded body circumference.

Rotating Tip Electrode

A new element for having consistent spacing between the high voltage electrode and the torch grounded body is provided by using a rotating tip electrode in the system, which will not constraint/choke the flow of syngas or air or syngas—air mixture through an arc start up gap.

The new element comprises a rotating tip electrode design, wherein the high voltage electrode will be a small diameter rod axially aligned or axially parallel to the center line of the torch. The end of this rod is brought closer to the torch grounded body, via a unique bent or a number of curves/bents or a variable angle mechanism. The tip of the rod is at an arc striking/initiating distance from the torch body.

In order to avoid striking the arc at the same location, every time the starter attempts to re-start the arc, the rod/pin/tip will be rotating at a suitable speed. By implementing this rotating tip element, the arc startup points are randomly distributed on the circumference of the torch, as a consequence, the arc is axis symmetrically distributed inside the torch void.

The rotating electrode can comprise one or more tips having the same or different lengths. The use of two or more tips tip that are axially offset from each other, will add a second dimension, in which the arc starting point can be spread along. Alternatively for a continuous spread of the arc start up area, the rotating electrode comprising of one or more than one tip can also be axially vibrating up and down. This way the tip(s) is/are rotating tangentially and vibrating axially. Consequently the arcing points are spread out over a lateral are of a cylinder.

One stationary tip will result in a number of startup point concentrated around a single point, while applying a rotating tip will result in spreading the startup points over a circumference of a circle. Using a number of rotating tips, which are axially offset from each other, will result in a spreading the arc startup points over a circumference of a cylinder.

The shape of the electrode tip is sharpened to benefit from the thermionic cooling effect phenomenon, thereby increasing the life and performance of the electrode. Other shapes, such as smooth hemispherical ends, are also possible and can be implemented. Also, utilizing a sharp tip provides thermionic cooling.

Figure 36:
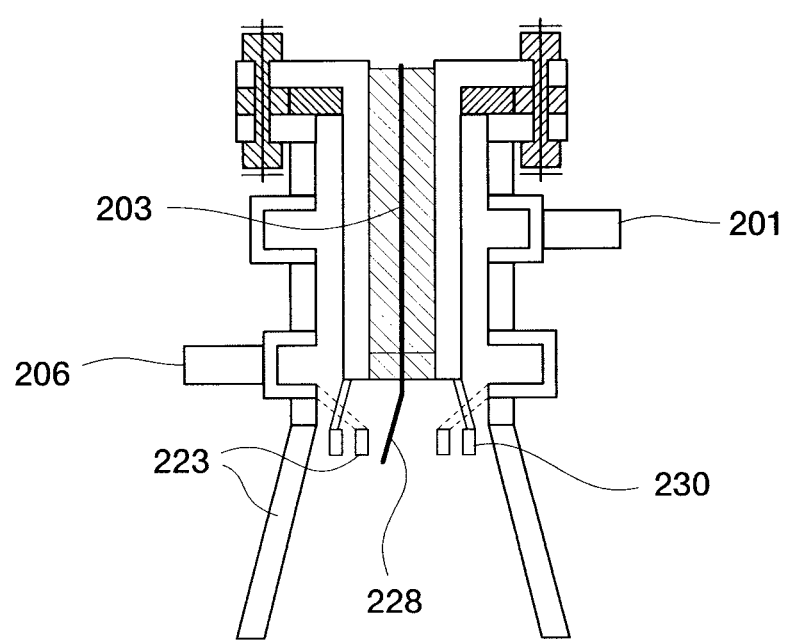
FIG. 36 illustrates an embodiment of the invention, comprising of a high voltage external ring electrode 230 and a high voltage rotating electrode 228, surrounding a low voltage inner ring electrode 223. The "legs" 218 of the two ring electrodes are offset from each other and are coated with an electrically insulating layer to maintain the potential difference between them.

As illustrated in FIG. 36, a system comprising of a combination of rotating electrodes and stationary electrodes can be utilized to optimize the performance of the system under specific operating conditions.

Method for Conversion and Cleaning of Syngas

Figure 18:
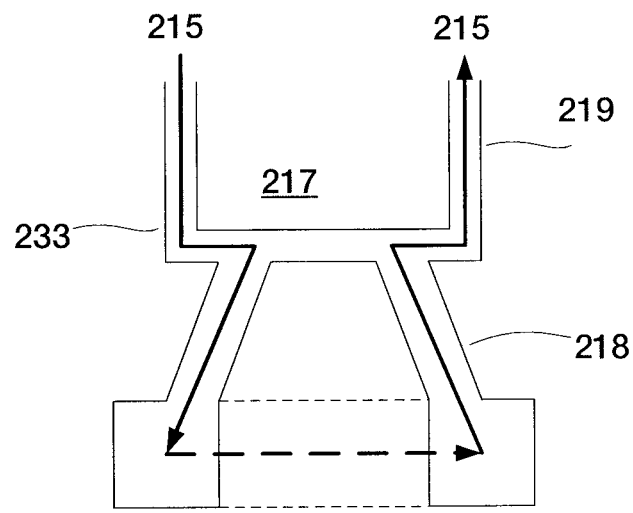
FIGS. 18 and 19 show optional cooling pathways that can be built into the high voltage electrode of the non-equilibrium plasma system, where a coolant flows 215 through a channel between the high voltage electrode inner wall 219 and high voltage electrode outer wall 233.
Figure 19:
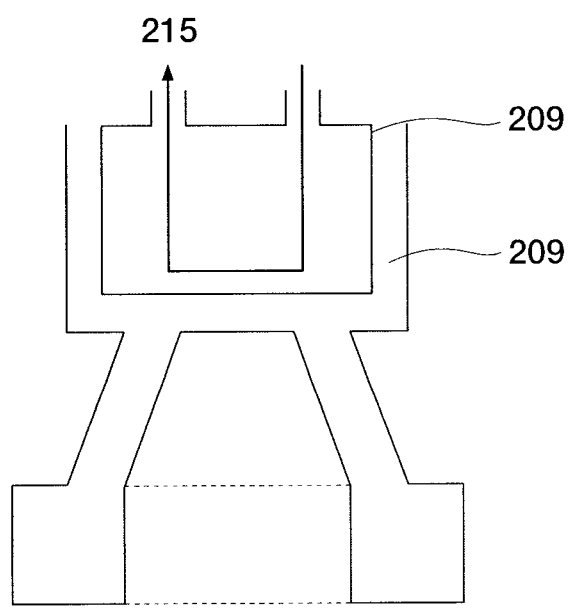
Figure 20:
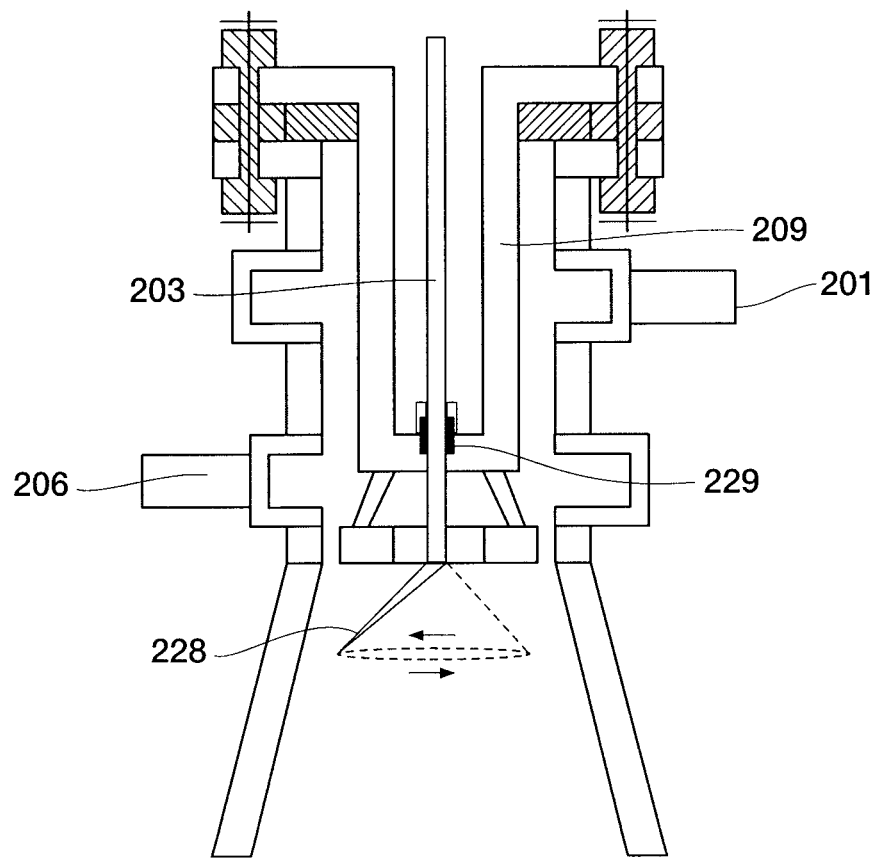
FIG. 20 shows one embodiment of the non-equilibrium plasma system wherein the high voltage comprises a rotating electrode 228. The figure further shows the high voltage electrode body 209, the rotating shaft 203, the packing gland seal for the rotating shaft 229, which provides a mechanical seal between the electrode body and the process gases delivered via ports 201, 206.
Figure 21A:
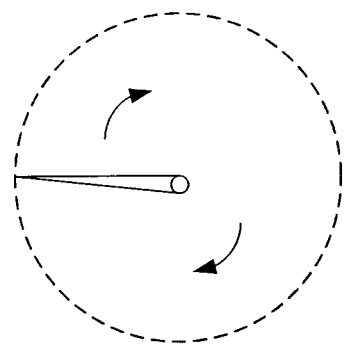
FIGS. 21A-C shows a simplified cross section of the rotating electrode 228 detailing alternate geometries of the rotating electrode 228.
Figure 21B:
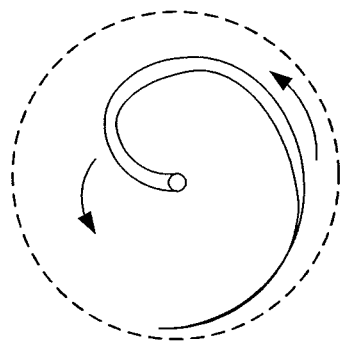
Figure 21C:
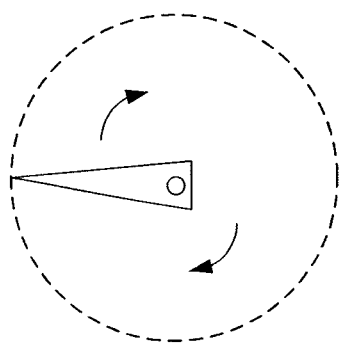
Figure 22A:
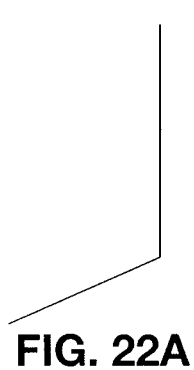
FIGS. 22A-E represents multiple configurations of electrode tips can be used with the rotating design and FIGS. 22A'-E' show their views from the top.
Figure 22B:
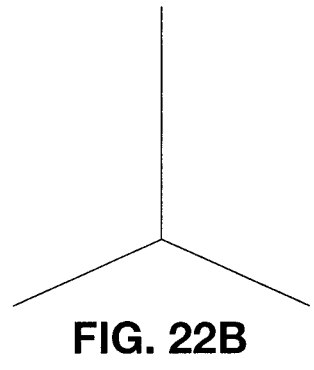
Figure 22C:
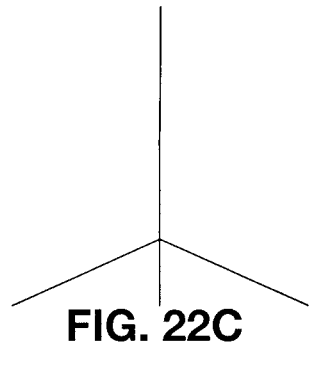
Figure 22A:
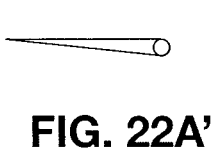
Figure 22B:
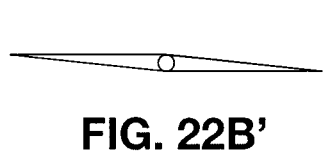
Figure 22C:
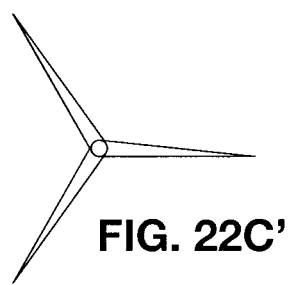
Figure 22D:
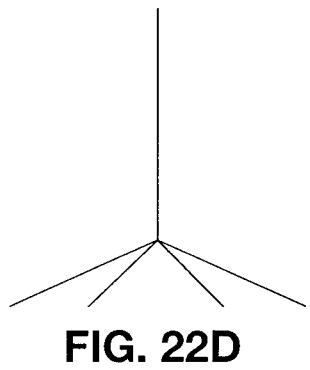
Figure 22E:
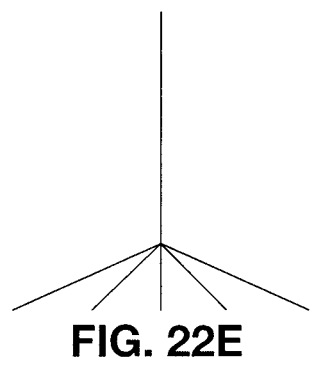
Figure 22D:
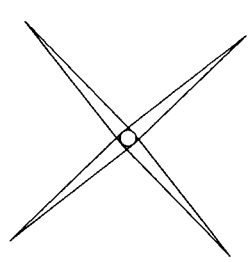
Figure 22E:
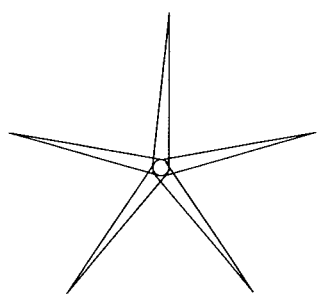
Figure 23:
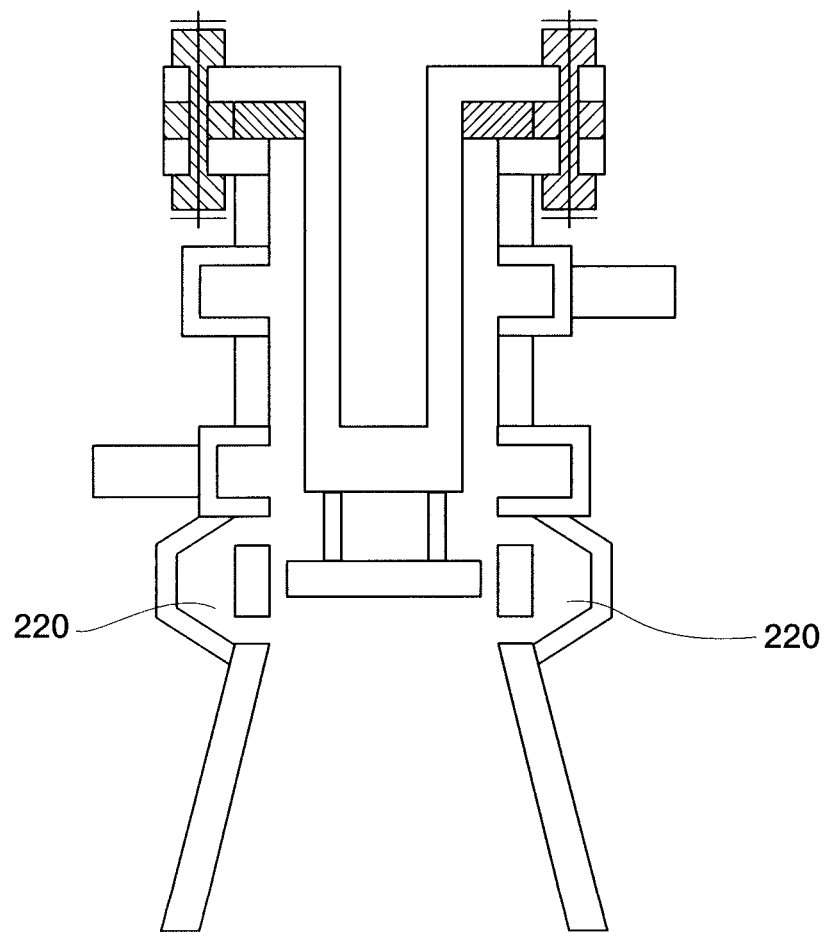
FIG. 23 shows a partial cross sectional view of one embodiment of the non-equilibrium plasma system configured to produce a lower pressure drop for the process gases, which is achieved using flow bypass channels 220.
Figures 24A, 24B:
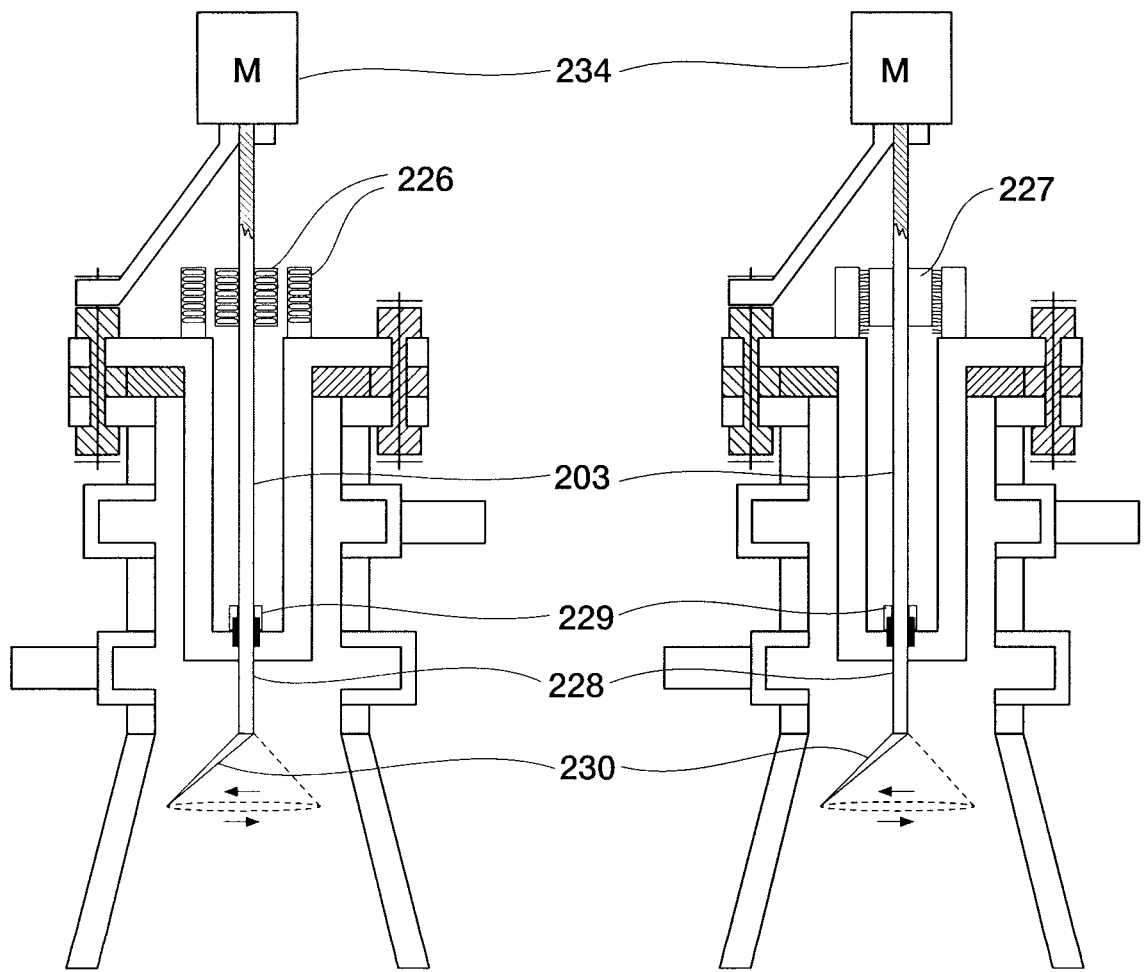
FIGS. 24A-B show a partial view of one embodiment of the non-equilibrium plasma system with rotating pin operatively connected to a grounded motor 234 providing torque to rotate the shaft 203 and the high voltage electrode 230.
Figures 25A, 25B:
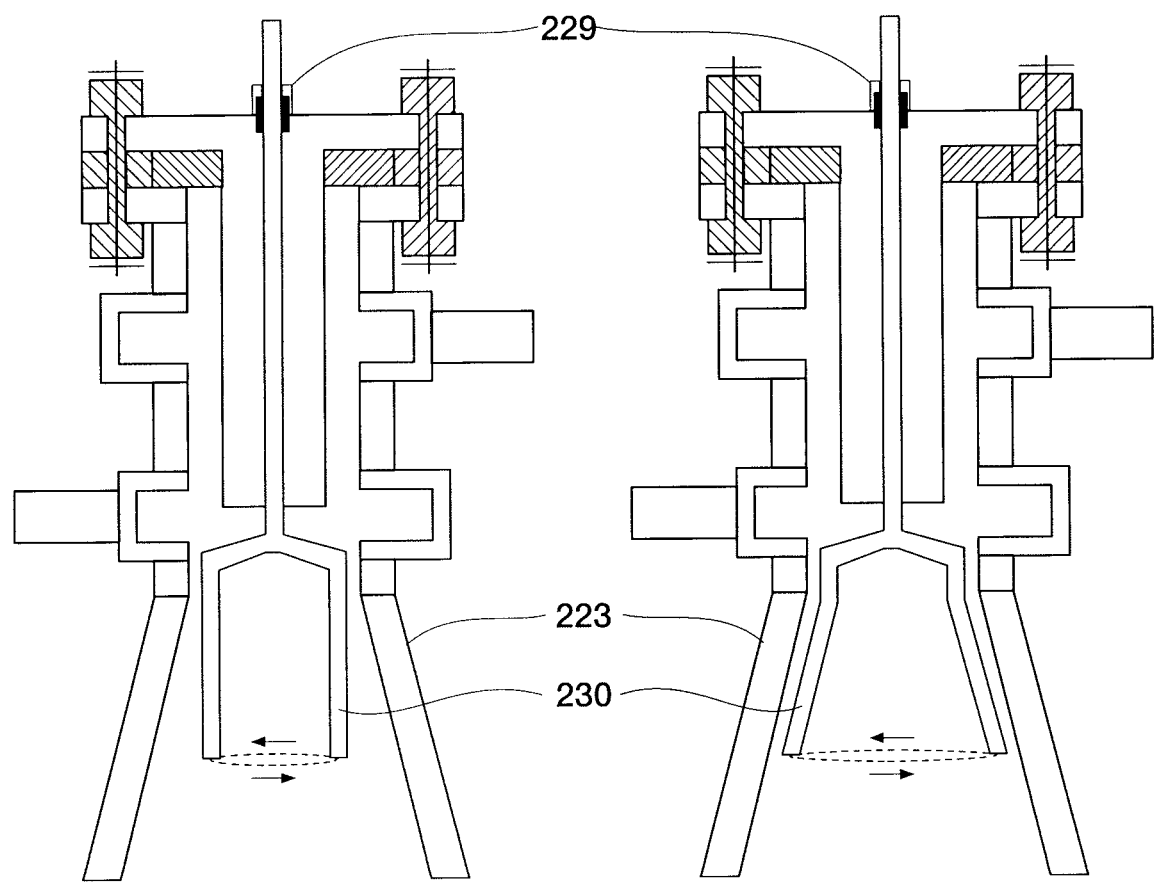
FIG. 25 shows a partial view of one embodiment of the non-equilibrium plasma system where the high voltage electrode 230 is in the shape of a rotating metal fork. In FIG.
Figure 26C:
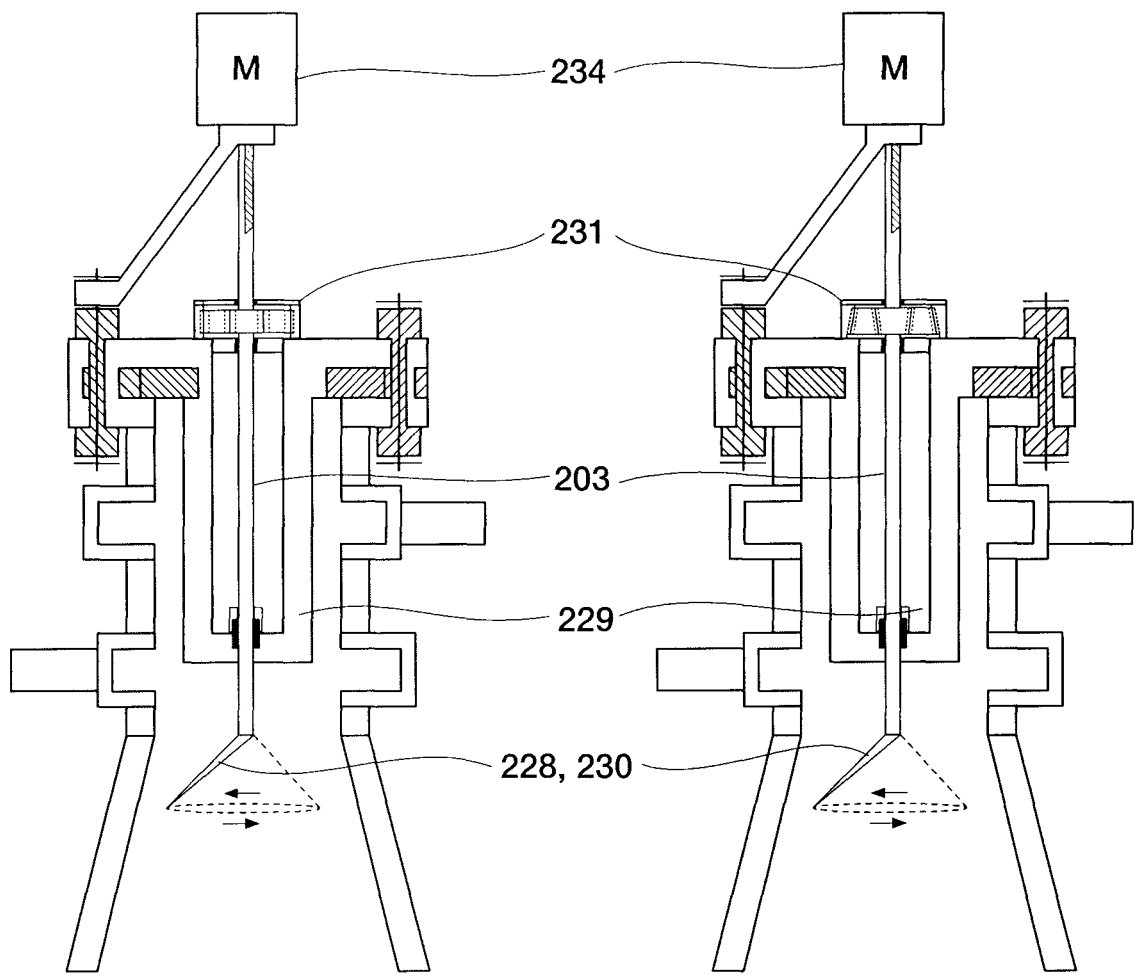
FIG. 26C shows a view of the planetary gears 231 from above, with the shaft 203 in the middle and the stationary outer gear ring being connected by planetary gears that rotate between the two of them.
Figure 26C:
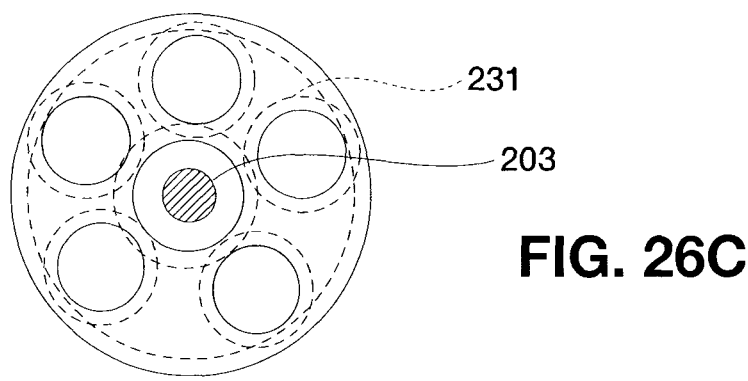
Figure 27A:
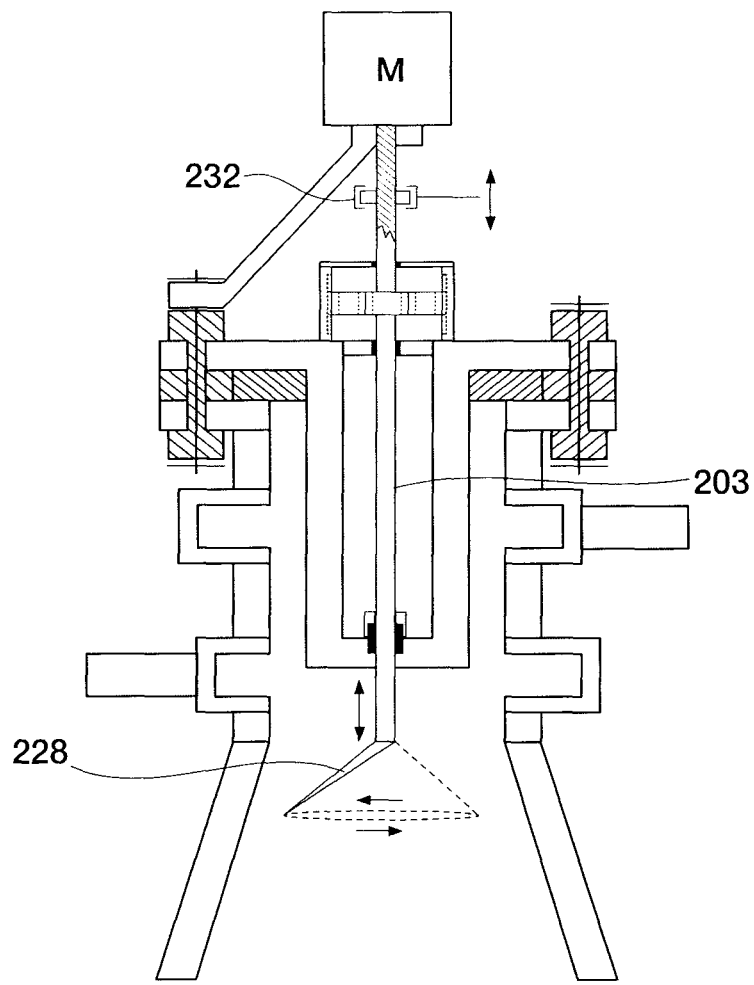
FIG. 27A shows a partial view of one embodiment of the non-equilibrium plasma system having a rotating shaft 203 fitted with a vertical motion collar 232, which can be used to adjust the height of the high voltage electrode as it rotates. The rotating electrode is 228. Height adjustment can be done manually or automatically (oscillating or adjusting up/down based on voltage characteristics), see FIG. 27B.
Figure 27B:
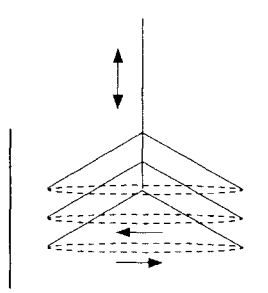
Figure 28:
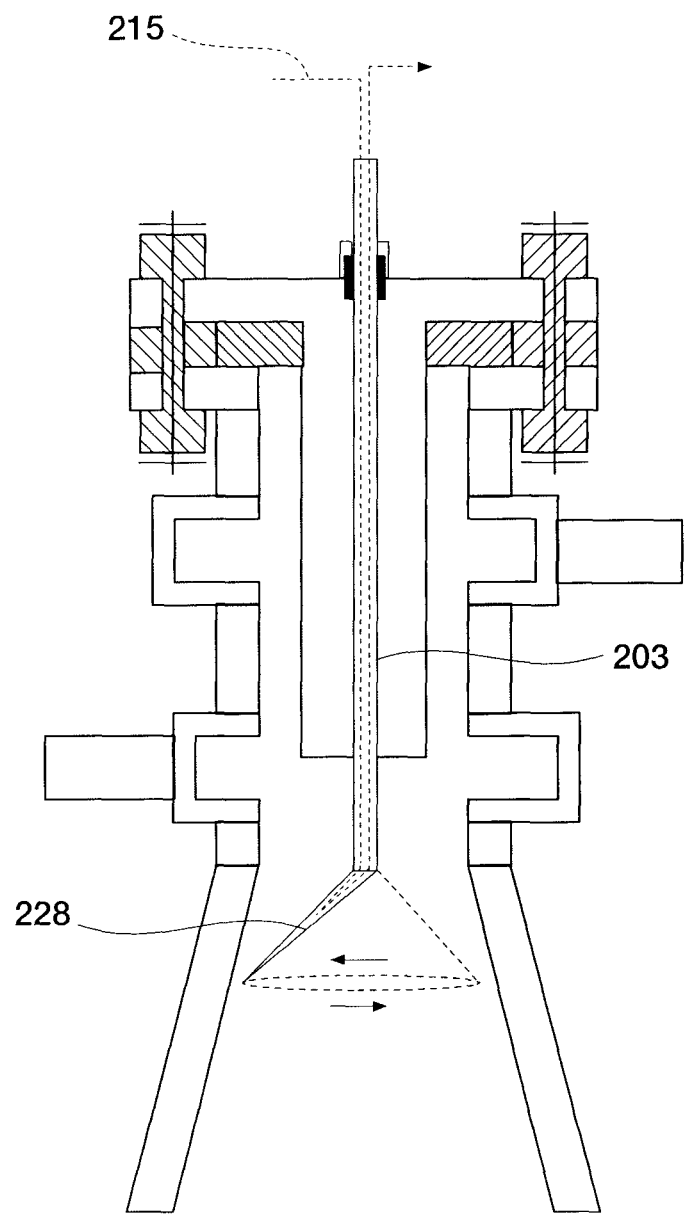
FIG. 28 shows a partial view of one embodiment of the non-equilibrium plasma system having a conduit for non-conductive coolant flow 215 down the center of the rotating shaft 203 of the rotating electrode 228.
Figure 30A:
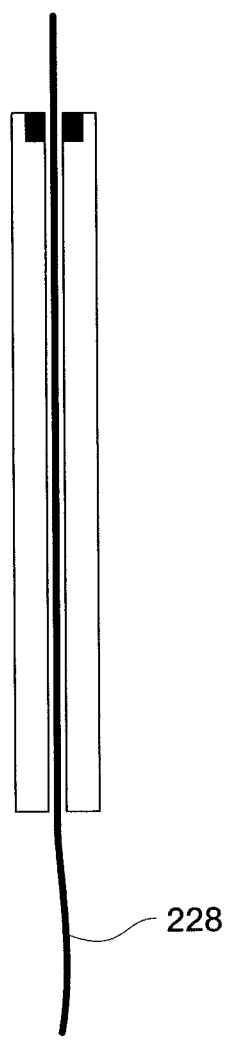
FIGS. 30A-B illustrate an embodiment, where the rotating electrode 228 is flexible enough that it warps its shape as the speed of rotation increases.
Figure 30B:
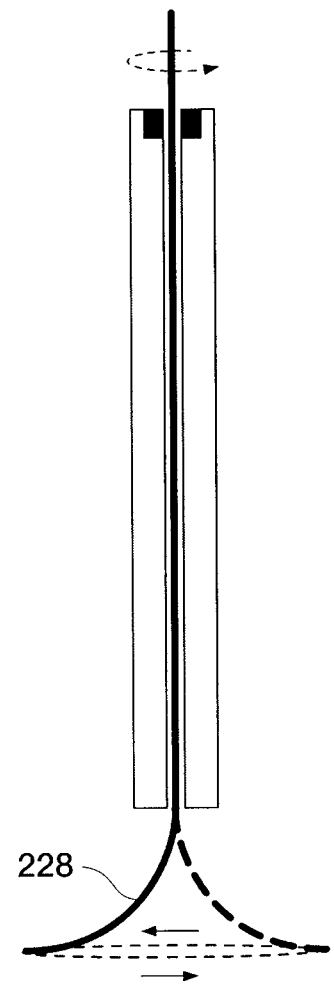
Figure 31A:
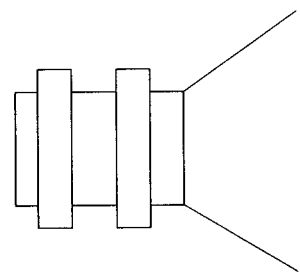
FIGS. 31A-D illustrates the possible cross sectional configurations of the section after the plasma arc generating point.
Figure 31B:
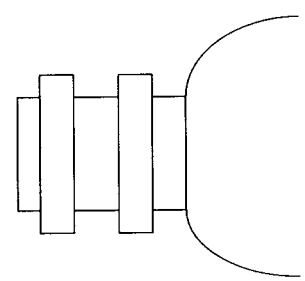
Figure 31C:
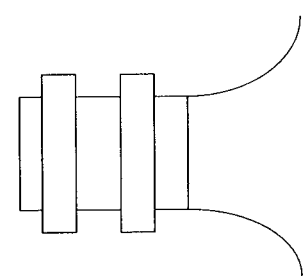
Figure 31D:
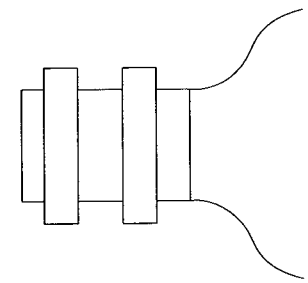

The present invention also discloses a method for syngas conversion and cleaning using the non-equilibrium plasma. The main characteristic of the method is to use the system discloses before and to combine the syngas, the air and the plasma arc formed between electrodes in the same region, which will co-exist in the same location. The electrodes of the system are optionally cooled by a coolant that flows through a channel between the inner wall 219 and outer wall 233 of the electrode (FIG. 18).

The non-equilibrium plasma method of refining syngas, using the system of the present invention comprising the steps of:
  inputting syngas and a gasifying agent into a reactor, such that there is an axially symmetric and swirling flow pattern; wherein the reactor has a high voltage electrode and a ground electrode,
  applying a high voltage potential across the arc initiating gap thereby creating a non-equilibrium plasma producing electric arc upon application of a high voltage potential across an arc initiating gap between the high voltage electrode and the ground electrode.

In addition, the non-equilibrium plasma method of refining syngas comprises combining syngas and one or more gasifying agents in proximity to the plasma arc.

Combination Systems

Optionally, in some systems non-equilibrium plasma reformulation is combined with thermal plasma and/or catalytic reformulation processes.

Appropriate hot plasma and catalysts are known in the art and include those disclosed in WO2008/138117.

Control System

The system may further comprise a control system. Appropriate control systems are known in the art and may include those disclosed in WO2008/138117.

The invention being thus described, it will be apparent that the same may be varied in many ways.

Such variations are not to be regarded as a departure from the spirit and scope of the invention, and all such modifications as would be apparent to one skilled in the art are intended to be included within the scope of the following claims.

Embodiment of the invention in which an exclusive property or privilege is claimed are defined as follows:

1. A non-equilibrium plasma system for refining of syngas, the system comprising:
  a reactor comprising:
    a hollow chamber having a first end and a second end; the chamber having a gas outlet proximal to the second end and a single inlet manifold proximal to the first end; wherein the single inlet manifold is configured to input gas tangentially into the hollow chamber, the single inlet manifold comprising a first eccentric cylindrical manifold having a first diameter for gasifying agent input and a second eccentric cylindrical manifold having a second diameter for syngas input and wherein the first diameter and the second diameter are offset and the single inlet manifold is configured to promote an axially symmetric and swirling flow pattern,
    a high voltage electrode; and
    a ground electrode in a side wall of the chamber separated from the high voltage electrode by an arc initiating gap, wherein the system is configured to create a non-equilibrium plasma producing electric arc upon application of a high voltage potential across the arc initiating gap, wherein the single inlet manifold is configured to input gas in proximity to the arc, and wherein the one or more gasifying agents are selected from the group consisting of air, $O_2$, enriched air, steam, $CO_2$, $O_3$, $H_2S$, $H_2O_2$ or combinations thereof.

2. The non-equilibrium plasma system of claim 1, wherein the high voltage electrode is hollow and comprises an insert or a means for circulating a cooling fluid in said hollow electrode interior to promote a convection cooling.

3. The non-equilibrium plasma system of claim 2, wherein the electrode insert is made of highly conductive material and wherein the electrode insert comprises a high thermionic emissivity material comprising hafnium, zirconium, tungsten, thorium, lanthanum, strontium, or alloys thereof.

4. The non-equilibrium plasma system of claim 1, wherein the high voltage electrode is configured as a rotating electrode or a fixed electrode and optionally wherein the high voltage electrode comprises a ring, tips, pin, fork, wire, coil or blades.

5. The non-equilibrium plasma system of claim 1, wherein the reactor has a frustum shaped section and wherein the ground electrode is located in the frustum shaped section.

6. The non-equilibrium plasma system of claim 1, wherein the high voltage electrode comprises an electrode body and an electrode end and wherein the diameter of the electrode end is larger than the high voltage electrode body.

7. The non-equilibrium plasma system of claim 6, wherein the electrode end is configured as a ring and optionally wherein the electrode ring has a shape selected from square, circular, square with round corners, parabolic, vertically oriented rectangular shape, vertically oriented elliptical, horizontally oriented rectangular shape, horizontally oriented elliptical, oval shape or air foil shape.

8. The non-equilibrium plasma system of claim 1, wherein the high voltage electrode comprises a ring-shaped high voltage electrode end, wherein the ring-shaped high voltage electrode end is sized to provide an arc initiating gap and wherein the ring-shaped high voltage electrode end is operatively connected to the electrode body via one or more legs.

* * * * *